United States Patent
Kitazato et al.

(10) Patent No.: US 10,225,520 B2
(45) Date of Patent: Mar. 5, 2019

(54) CONTENT PROVIDING APPARATUS AND METHOD, CONTENT RECEIVING APPARATUS AND METHOD, PROGRAM, AND CONTENT DOWNLOADING SYSTEM

(75) Inventors: Naohisa Kitazato, Tokyo (JP); Yoshiharu Dewa, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 824 days.

(21) Appl. No.: 12/472,823

(22) Filed: May 27, 2009

(65) Prior Publication Data

US 2009/0313663 A1     Dec. 17, 2009

(30) Foreign Application Priority Data

Jun. 13, 2008   (JP) ................................ 2008-155455
Apr. 7, 2009    (JP) ................................ 2009-092675

(51) Int. Cl.
*H04N 21/24*     (2011.01)
*H04N 21/254*    (2011.01)
(Continued)

(52) U.S. Cl.
CPC ..... *H04N 7/17327* (2013.01); *H04N 21/2404* (2013.01); *H04N 21/2541* (2013.01);
(Continued)

(58) Field of Classification Search
CPC ...... H04N 21/20; H04N 21/21; H04N 21/236; H04N 21/2221; H04N 21/26283;
(Continued)

(56) References Cited

U.S. PATENT DOCUMENTS 5,987,509 A * 11/1999 Portuesi .................. 725/113
6,144,376 A * 11/2000 Connelly .................. 725/44
(Continued)

FOREIGN PATENT DOCUMENTS

| CN | 1516466 A   | 7/2004  |
|----|-------------|---------|
| CN | 101060617 A | 10/2007 |

(Continued)

OTHER PUBLICATIONS

U.S. Appl. No. 12/472,823, filed May 27, 2009, 2009-0313663, Kitazato, et al.

(Continued)

*Primary Examiner* — Pinkal R Chokshi
(74) *Attorney, Agent, or Firm* — Oblon, McClelland, Maier & Neustadt, L.L.P.

(57) ABSTRACT

A content providing apparatus for providing a content to a content receiving apparatus. The content providing apparatus includes: a content-information providing mechanism providing content information necessary for specifying a content to be downloaded to the content receiving apparatus; a control-information providing mechanism providing download control information necessary for downloading the content and corresponding to the content specified on the basis of the content information to the content receiving apparatus; a delivery mechanism delivering a broadcast-based content using a broadcasting signal in accordance with a predetermined broadcasting schedule; and a content providing mechanism providing a communication-based content through a network in response to a request from the content receiving apparatus on the basis of the download control information.

22 Claims, 29 Drawing Sheets

(51) Int. Cl.

| | | |
|---|---|---|
| *H04N 21/266* | (2011.01) | |
| *H04N 7/173* | (2011.01) | |
| *H04N 21/61* | (2011.01) | |
| *H04N 21/2665* | (2011.01) | |
| *H04N 21/433* | (2011.01) | |
| *H04N 21/472* | (2011.01) | |
| *H04N 21/6338* | (2011.01) | |
| *H04N 21/6405* | (2011.01) | |
| *H04N 21/6408* | (2011.01) | |
| *H04N 21/8355* | (2011.01) | |

(52) U.S. Cl.
CPC ....... *H04N 21/266* (2013.01); *H04N 21/2665* (2013.01); *H04N 21/433* (2013.01); *H04N 21/472* (2013.01); *H04N 21/6125* (2013.01); *H04N 21/6338* (2013.01); *H04N 21/6405* (2013.01); *H04N 21/6408* (2013.01); *H04N 21/8355* (2013.01)

(58) Field of Classification Search
CPC ............... H04N 21/6125; H04N 21/21; H04N 21/2183; H04N 21/222; H04N 21/221; H04N 21/226; H04N 21/23109; H04N 21/238; H04N 21/2381; H04N 21/2408; H04N 21/262283; H04N 21/2404; H04N 21/2665; H04N 21/2541; H04N 21/266; H04N 21/433; H04N 21/472; H04N 21/6338; H04N 21/6405; H04N 21/6408; H04N 21/8355
USPC .................... 725/39, 112, 113, 110
See application file for complete search history.

(56) References Cited

U.S. PATENT DOCUMENTS

| | | | | |
|---|---|---|---|---|
| 6,411,307 | B1* | 6/2002 | Rosin et al. ................. | 715/716 |
| 6,442,598 | B1* | 8/2002 | Wright et al. ............... | 709/217 |
| 6,459,427 | B1* | 10/2002 | Mao et al. ................... | 725/109 |
| 6,487,543 | B1* | 11/2002 | Ozaki et al. ................. | 725/112 |
| 6,522,342 | B1* | 2/2003 | Gagnon et al. .............. | 715/716 |
| 7,047,306 | B2* | 5/2006 | Zee ....................... | H04L 12/185 |
| | | | | 709/231 |
| 7,152,236 | B1* | 12/2006 | Wugofski .......... | H04N 5/44543 |
| | | | | 725/40 |
| 2003/0121047 | A1* | 6/2003 | Watson .............. | H04N 7/17318 |
| | | | | 725/93 |
| 2004/0078824 | A1* | 4/2004 | Krisbergh et al. ........... | 725/105 |
| 2004/0226045 | A1* | 11/2004 | Nadarajah ......... | H04N 7/17327 |
| | | | | 725/97 |
| 2005/0071871 | A1* | 3/2005 | Yuzawa ............. | H04N 5/44504 |
| | | | | 725/48 |
| 2005/0160465 | A1 | 7/2005 | Walker | |
| 2007/0130068 | A1* | 6/2007 | Kitazato ............ | H04N 21/2541 |
| | | | | 705/50 |
| 2007/0136322 | A1* | 6/2007 | Cormack ........... | H04N 5/44543 |
| 2008/0022310 | A1* | 1/2008 | Poling ............... | H04N 5/44543 |
| | | | | 725/46 |
| 2008/0022322 | A1* | 1/2008 | Grannan ............ | H04N 5/44591 |
| | | | | 725/78 |
| 2008/0030618 | A1 | 2/2008 | Okamoto et al. | |
| 2008/0141328 | A1* | 6/2008 | Weintraub ......... | H04N 7/17318 |
| | | | | 725/134 |
| 2008/0201746 | A1* | 8/2008 | Xu ......................... | H04H 60/72 |
| | | | | 725/54 |
| 2008/0250467 | A1* | 10/2008 | Oh ..................... | H04N 21/4345 |
| | | | | 725/114 |
| 2008/0276283 | A1* | 11/2008 | Boyer et al. .................... | 725/51 |
| 2009/0019500 | A1* | 1/2009 | Tanaka .............. | H04N 21/8173 |
| | | | | 725/100 |
| 2009/0165046 | A1* | 6/2009 | Stallings ............. | H04N 5/4403 |
| | | | | 725/39 |
| 2009/0265743 | A1 | 10/2009 | Gao | |
| 2009/0276808 | A1* | 11/2009 | Jerding et al. .................. | 725/47 |
| 2010/0146551 | A1* | 6/2010 | Barton ............... | G11B 20/0021 |
| | | | | 725/46 |
| 2012/0072851 | A1* | 3/2012 | Stern ............................ | 715/745 |

FOREIGN PATENT DOCUMENTS

| | | |
|---|---|---|
| EP | 1 691 552 A2 | 8/2006 |
| EP | 2 003 587 A2 | 12/2008 |
| EP | 2 018 063 A2 | 1/2009 |
| JP | 2000-113066 | 4/2000 |
| JP | 2002-229881 | 8/2002 |
| JP | 2003-69514 A | 3/2003 |
| JP | 2004-134847 A | 4/2004 |
| JP | 2004-193920 A | 7/2004 |
| JP | 2005-4663 | 1/2005 |
| JP | 2035-65255 | 3/2005 |
| JP | 2005-167493 | 6/2005 |
| JP | 2006-303990 A | 11/2006 |
| JP | 2007-243903 | 9/2007 |
| JP | 2008-22411 | 1/2008 |
| WO | WO 2004/102309 A2 | 11/2004 |
| WO | WO 2004/102309 A3 | 11/2004 |

OTHER PUBLICATIONS

U.S. Appl. No. 13/238,080, filed Sep. 21, 2011, Kitazato, et al.
U.S. Appl. No. 13/238,065, filed Sep. 21, 2011, Kitazato.
U.S. Appl. No. 13/238,264, filed Sep. 21, 2011, Kitazato.
U.S. Appl. No. 13/238,277, filed Sep. 21, 2011, Kitazato.
U.S. Appl. No. 13/238,138, filed Sep. 21, 2011, Kitazato.
U.S. Appl. No. 13/239,871, filed Sep. 22, 2011, Kitazato.
The Extended European Search Report dated Feb. 6, 2012, in Europe Application No. / Patent No. 11190471.0-2223.
Peter Siebert, "Hybrid Broadband/Broadcast Systems and Set-top Boxes", Broadband Multimedia Systems and Broadcasting, Mar. 31, 2008, XP031268596, 6 pages.
Communication pursuant to Article 94(3) EPC dated Oct. 5, 2012, in European Patent Application No. 11 190 471.0.
Office Action dated Jan. 24, 2013 in Japanese Patent Application No. 2011-013988.
Office Action dated Jan. 24, 2013 in Japanese Patent Application No. 2011-013989.
European Office Action dated May 13, 2013 in Patent Application No. 11190471.0.
Japanese Office Action dated Jul. 22, 2014, in Japan Patent application No. 2013-147549.
Combined Chinese Office Action and Search Report dated Jan. 19, 2016 in Patent Application No. 201310426006.0 (with English language translation).
Extended European Search Report dated Jul. 28, 2009 in Patent Application No. 09 16 2359.
Chinese Office Action dated Sep. 27, 2016 in Patent Application No. 201310426006.0 (English Translation only).
Notice of Grant dated Sep. 12, 2013 in Patent Application No. 2011-013988 (without English Translation).
Notice of Grant dated May 23, 2013 in Patent Application No. 2011-013989 (without English Translation).
Notice of Grant dated Jan. 6, 2015 in Patent Application No. 2013-147549 (without English Translation).
Notice of Grant dated Mar. 24, 2011 in Patent Application No. 2009-092675 (without English Translation).
Decision of Rejection dated Oct. 28, 2010 in Patent Application No. 2009-092675 (without English Translation).

* cited by examiner

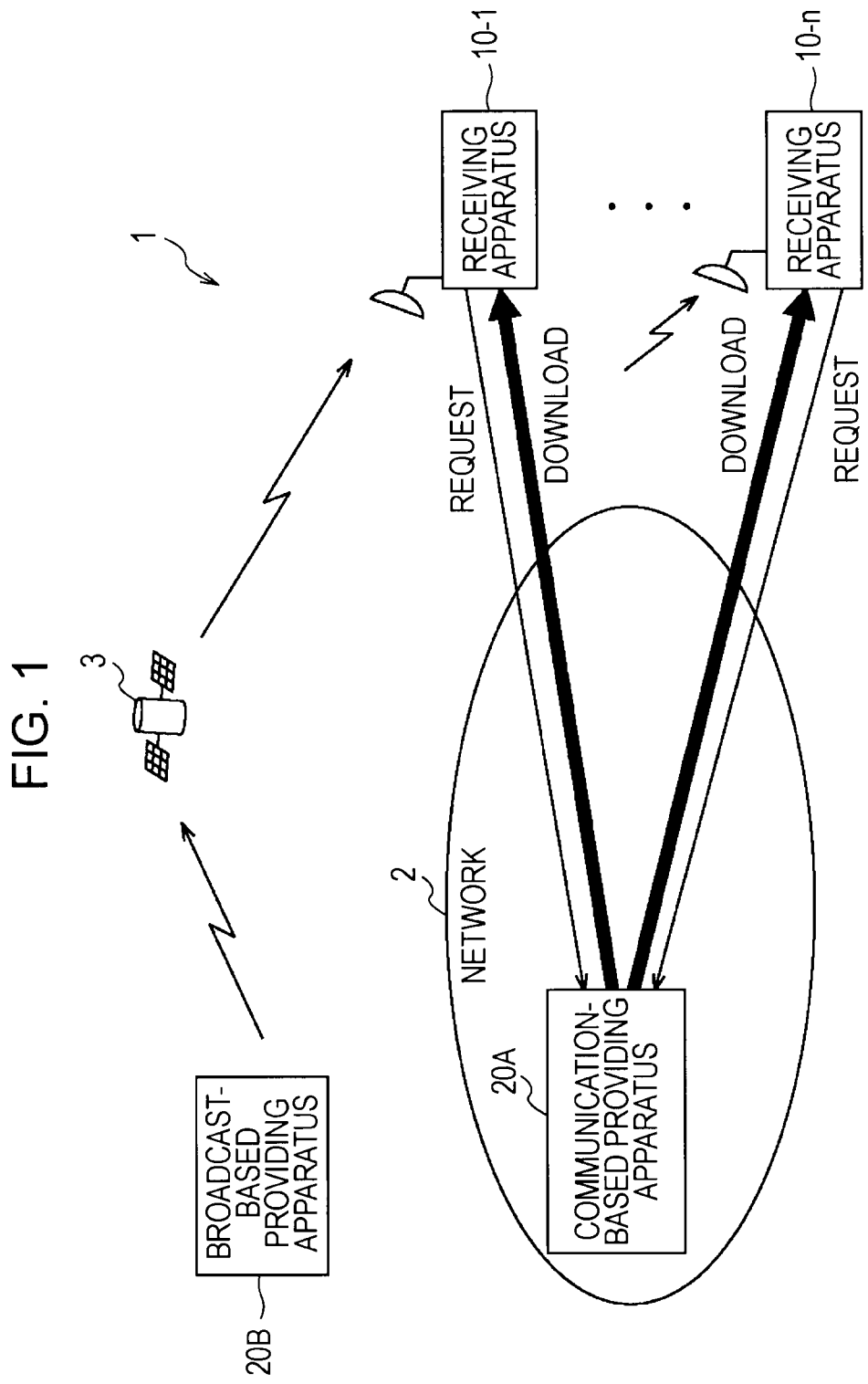

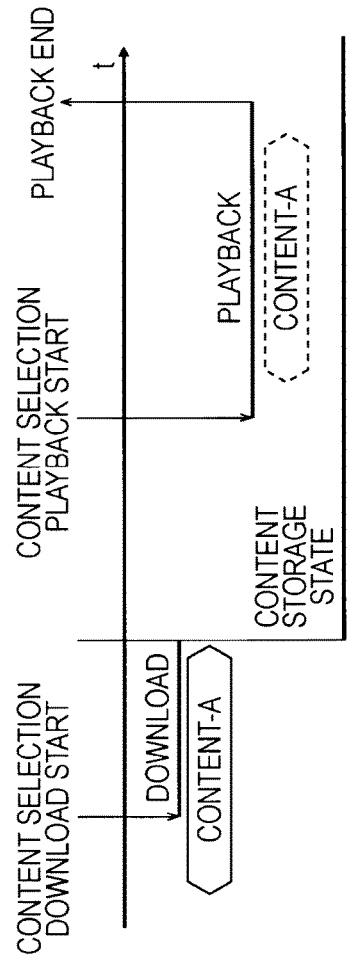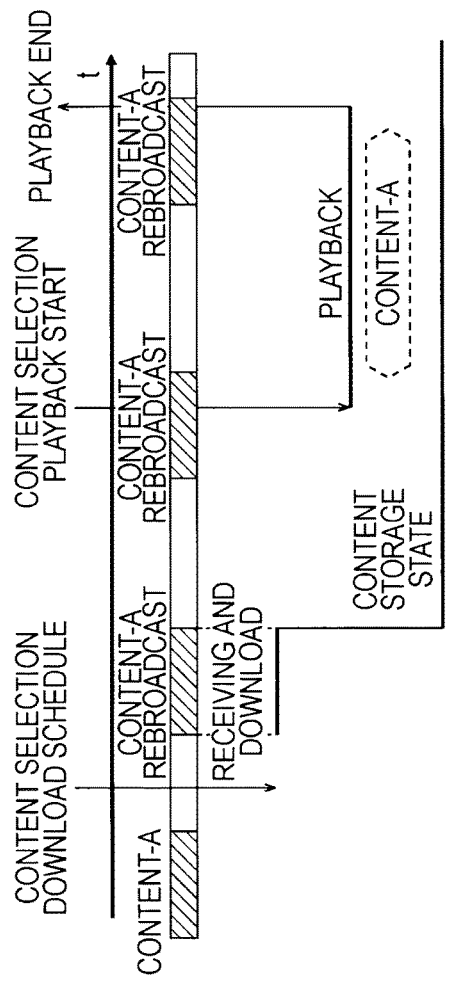

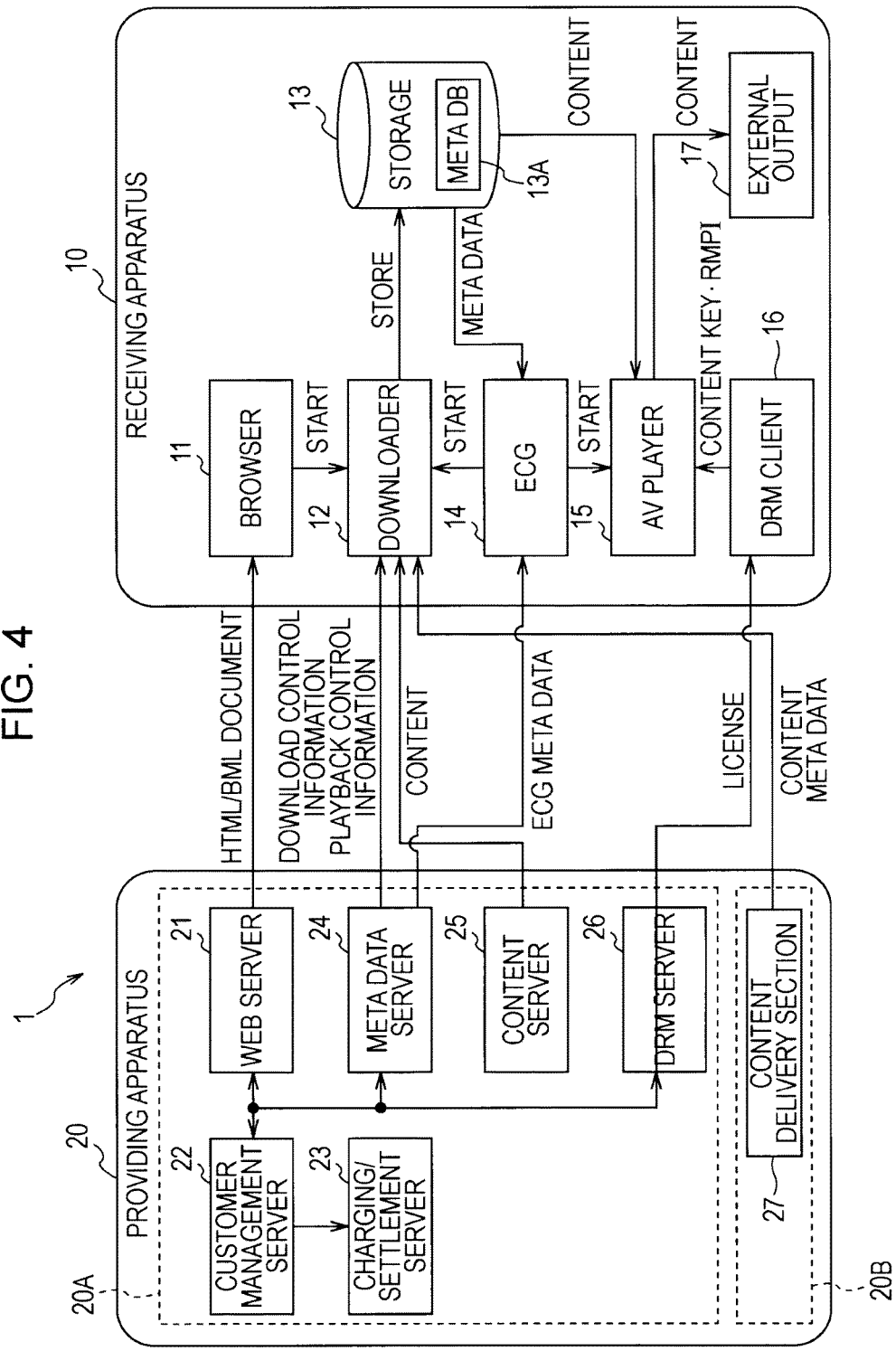

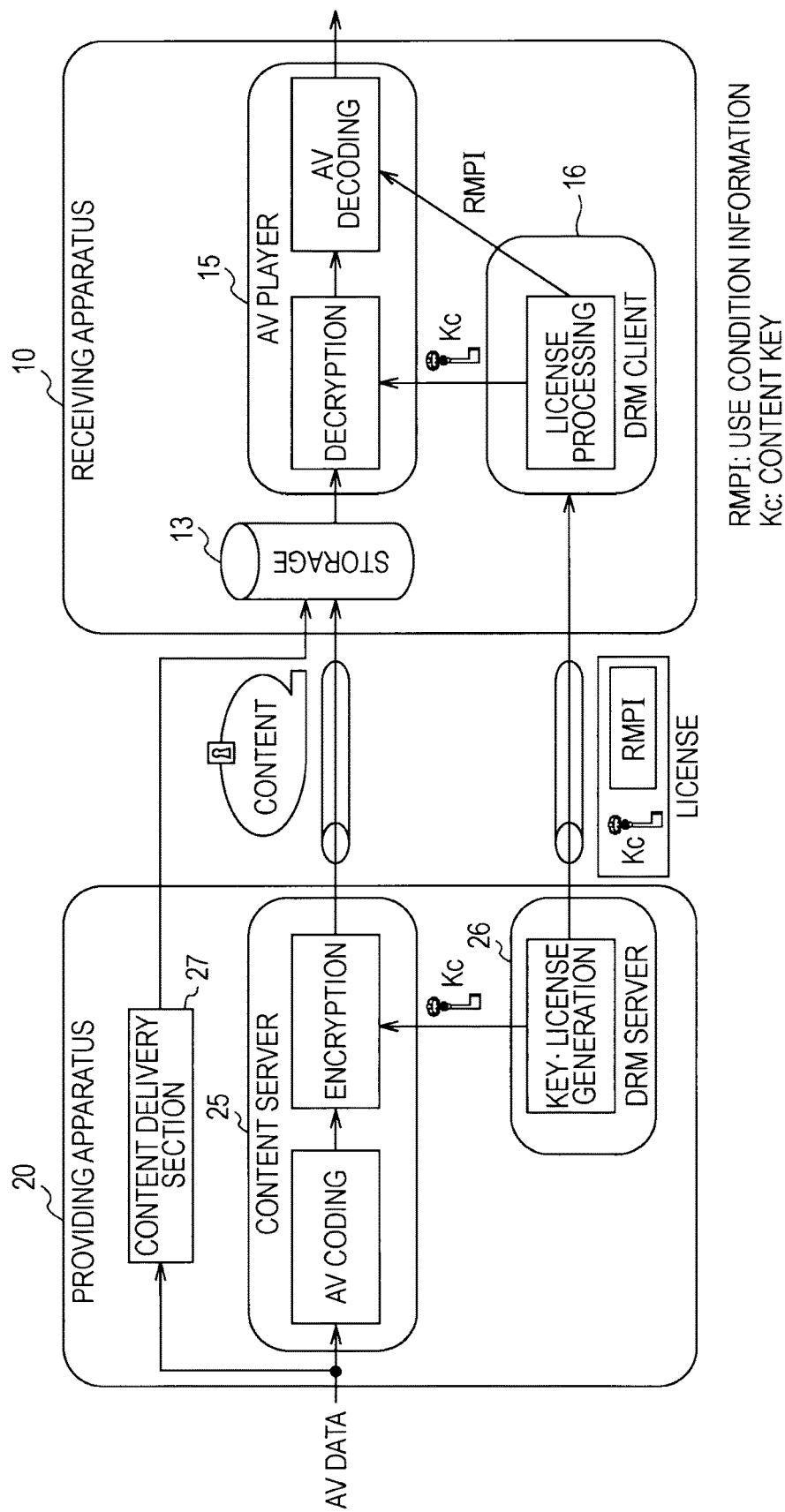

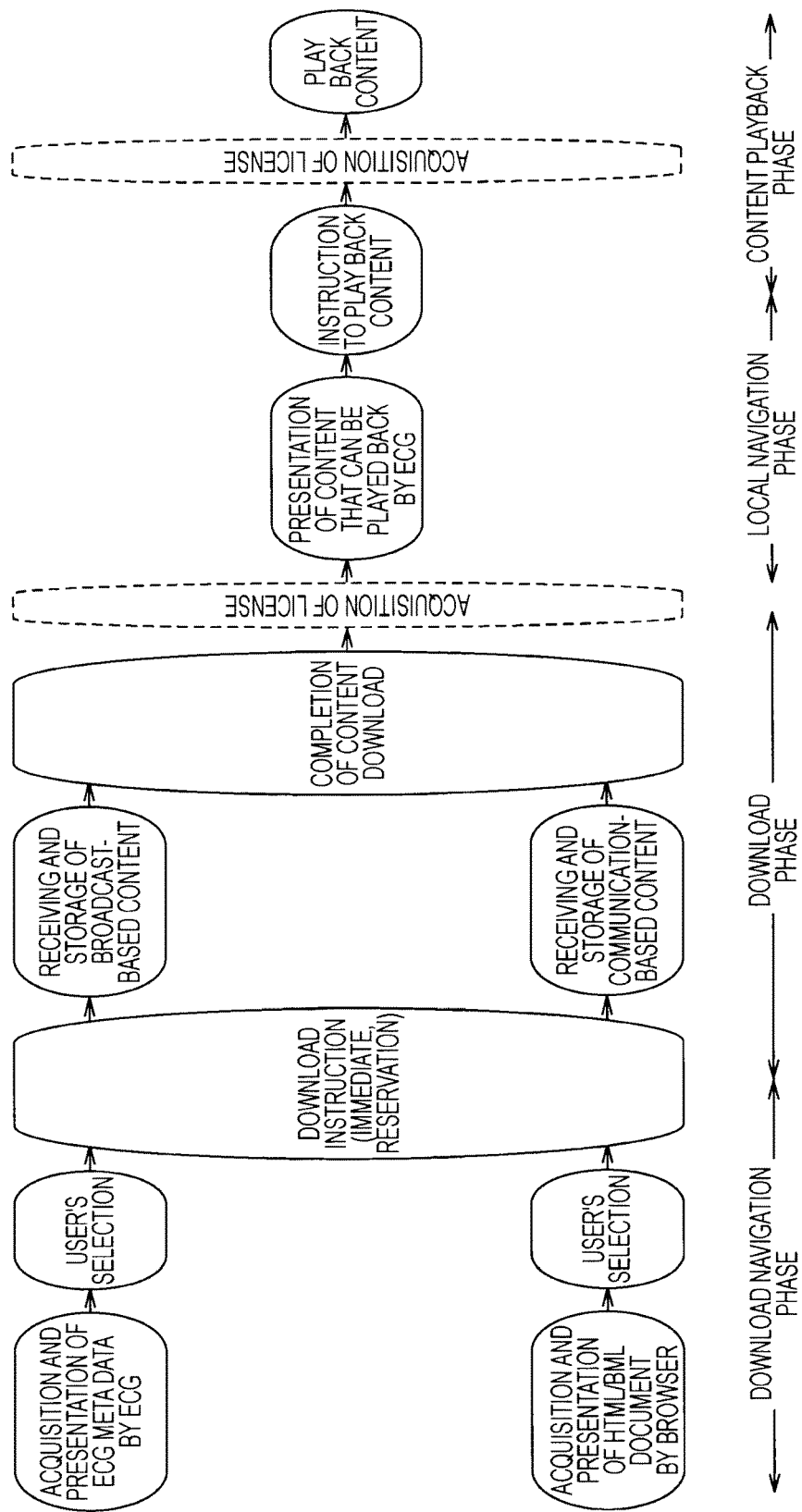

FIG. 9
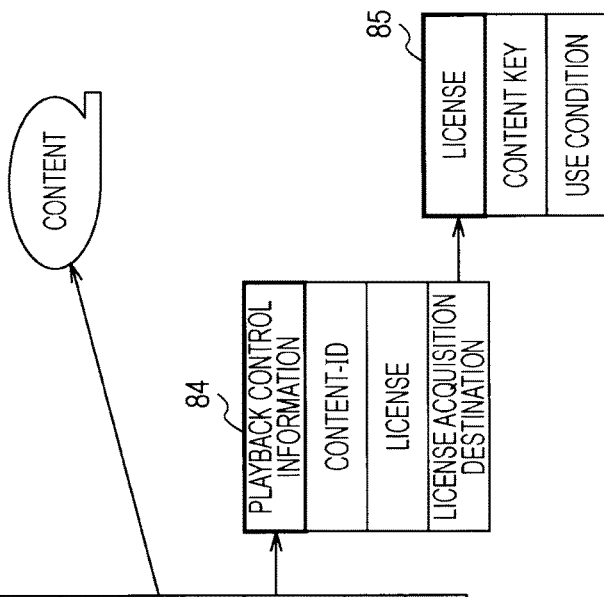
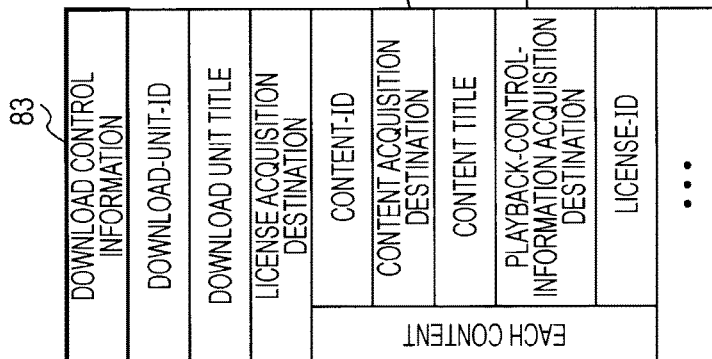
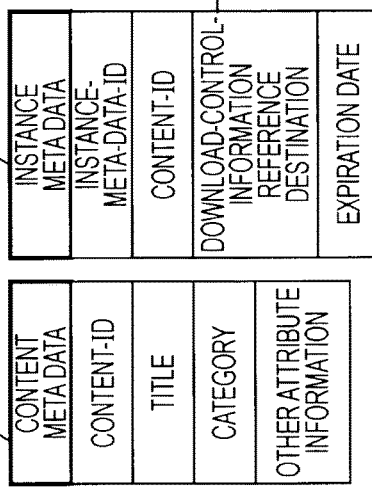
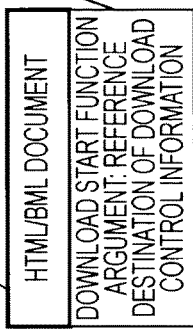

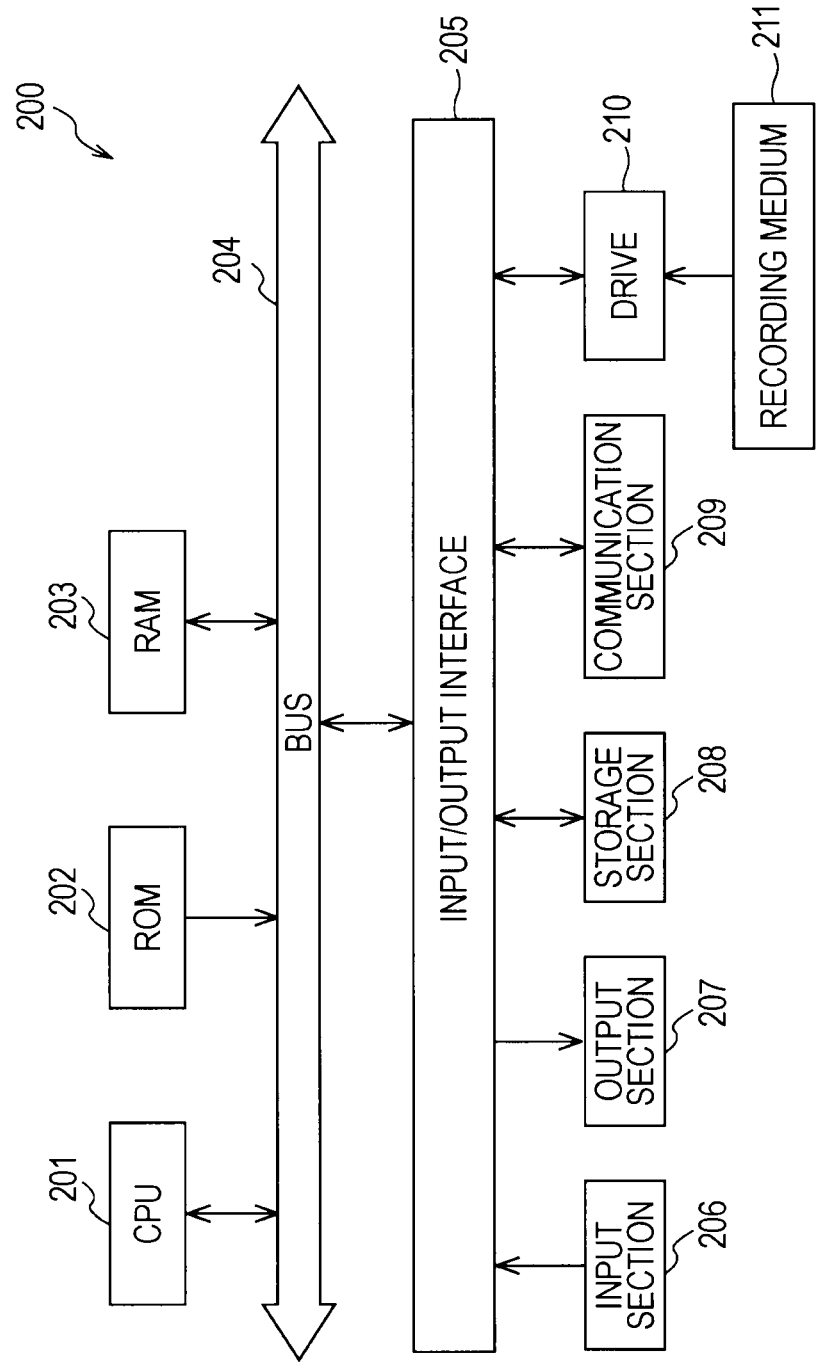

CONTENT PROVIDING APPARATUS AND METHOD, CONTENT RECEIVING APPARATUS AND METHOD, PROGRAM, AND CONTENT DOWNLOADING SYSTEM

BACKGROUND OF THE INVENTION

1. Field of the Invention

The present invention relates to a content providing apparatus and method, a content receiving apparatus and method, a program, and a content downloading system. More particularly, the present invention relates to a content providing apparatus and method, a content receiving apparatus and method, a program, and a content downloading system which allow using both television broadcasting and the Internet as a content communication path in a content download service.

2. Description of the Related Art

By the widespread use of high-speed data communication networks as typified by the Internet, content download services have already been provided in order to provide various contents as goods, such as music, movies, computer programs, etc (for example, refer to Japanese Unexamined Patent Application Publication No. 2000-113066).

In related-art content download services, a user connects a receiving apparatus to a predetermined server through the Internet, obtains a content from the connected predetermined server, stores the content, and uses (views) the stored content at any time the user likes.

On the other hand, in recent years, in television broadcasting, the amount of information that can be simultaneously broadcast has increased dramatically with digitization. In addition to general television programs, which are watched in real time, various kinds of data have been allowed to be broadcast at the same time. Accordingly, there have been proposals for using television broadcasting for content download services.

That is to say, proposals have been made of content download services in which a content is broadcast by television broadcasting, the broadcast content is received by and stored in a receiving apparatus, and the stored content is used (viewed) at any time.

SUMMARY OF THE INVENTION

As described above, to date, there have been content download services using the Internet as a content communication path. Also, proposals have been made of content download services using television broadcasting as a content communication path.

However, there has not been a content download service which can easily use both the Internet and the television broadcasting as content communication paths for individual purposes. If such a content download service is provided, the following operations become possible. For example, if a content is very popular and a large number of downloads of the content are expected, it becomes possible to perform an operation of downloading the content through broadcasting using television broadcasting. On the contrary, if a content is very specialized and is directed for a niche market in which a lot of downloads is not expected, it becomes possible to perform an operation of downloading the content through the Internet.

In this regard, for a user's operation of a receiving apparatus, it is desirable that the operation is common no matter whether the Internet or television broadcasting is used as a content communication path.

The present invention has been made in view of such circumstances. It is desirable to achieve a content download service capable of easily using both the Internet and television broadcasting individually as a content communication path depending on a situation.

According to an embodiment of the present invention, there is provided a content providing apparatus for providing a content to a content receiving apparatus, the content providing apparatus including: content-information providing means for providing content information necessary for specifying a content to be downloaded to the content receiving apparatus; control-information providing means for providing download control information necessary for downloading the content and corresponding to the content specified on the basis of the content information to the content receiving apparatus; delivery means for delivering a broadcast-based content using a broadcasting signal in accordance with a predetermined broadcasting schedule; and content providing means for providing a communication-based content through a network in response to a request from the content receiving apparatus on the basis of the download control information.

The download control information may include information indicating whether the corresponding content is the broadcast-based or the communication-based.

The content information may include information indicating whether the corresponding content is the broadcast-based or the communication-based.

The download control information corresponding to the broadcast-based content may further include information indicating a broadcasting schedule of the content of one time or more.

The download control information corresponding to the broadcast-based content may further include information described using either a URL (Uniform Resource Locator) or an IP (Internet Protocol) multicast address in order to identify a broadcast stream delivering the content.

The download control information corresponding to the broadcast-based content may further include alternative communication information indicating the content providing means providing the same communication-based content as the broadcast-based content.

The download control information corresponding to a content being the broadcast-based and being an updatable content may further include information indicating a broadcasting schedule of an after-update content of one time or more.

The control-information providing means may also provide playback control information necessary for the content receiving apparatus to play back a downloaded content in response to a request from the content receiving apparatus on the basis of the download control information.

The download control information may further include information indicating whether the content is updatable or non-updatable.

The content providing apparatus according to an embodiment may further include license providing means for providing through the network a license including a key for decrypting the encrypted content in response to a request from the content receiving apparatus on the basis of either the download control information or the playback control information.

According to an embodiment of the present invention, there is provided a method of providing a content in a content providing apparatus for providing a content to a content receiving apparatus, the method including the steps of: the content providing apparatus providing content information necessary for specifying a content to be downloaded to the content receiving apparatus; the content providing apparatus providing download control information necessary for downloading the content and corresponding to the content specified on the basis of the content information to the content receiving apparatus; the content providing apparatus delivering a broadcast-based content using a broadcasting signal in accordance with a predetermined broadcasting schedule; and the content providing apparatus providing a communication-based content through a network in response to a request from the content receiving apparatus on the basis of the download control information.

According to another embodiment of the present invention, there is provided a program for causing a computer providing a content to a content receiving apparatus to perform functions including: content-information providing means for providing content information necessary for specifying a content to be downloaded to the content receiving apparatus; control-information providing means for providing download control information necessary for downloading the content and corresponding to the content specified on the basis of the content information to the content receiving apparatus; delivery means for delivering a broadcast-based content using a broadcasting signal in accordance with a predetermined broadcasting schedule; and content providing means for providing a communication-based content through a network in response to a request from the content receiving apparatus on the basis of the download control information.

In the content providing apparatus according to an embodiment, content information necessary for specifying a content to be downloaded is provided to the content receiving apparatus; download control information necessary for downloading the content and corresponding to the content specified on the basis of the content information is provided to the content receiving apparatus; a broadcast-based content using a broadcasting signal is delivered in accordance with a predetermined broadcasting schedule; and a communication-based content is provided through a network in response to a request from the content receiving apparatus on the basis of the download control information.

According to another embodiment of the present invention, there is provided a content receiving apparatus including download means for obtaining download control information necessary for downloading the content from a content providing apparatus in response to a user's operation for selecting a content on the basis of the obtained download control information, downloading the content by receiving a broadcasting signal in the case of a broadcast-based content, and downloading the content from the content providing apparatus through a network in the case of a communication-based content.

The download control information corresponding to the broadcast-based content may further include alternative communication information for downloading the same communication-based content as the broadcast-based content, and if broadcasting of the broadcast-based content has been already completed, the download means downloads the same communication-based content as the broadcast-based content from the content providing apparatus through the network in accordance with the alternative communication information.

The download control information corresponding to the broadcast-based content may also download playback control information necessary for playing back the downloaded content from the content providing apparatus on the basis of the download control information.

The content receiving application may further include acquisition means for obtaining a license including a key for decrypting the encrypted content from the content providing apparatus through the network on the basis of either the download control information or the playback control information; and playback means for decrypting the encrypted content using the obtained license and playing back the content.

According to another embodiment of the present invention, there is provided a method of receiving a content in a content receiving apparatus, the method including the steps of: the content receiving apparatus obtaining download control information necessary for downloading the content from a content providing apparatus in response to a user's operation for selecting a content; on the basis of the obtained download control information, downloading the content by receiving a broadcasting signal in the case of a broadcast-based content; and downloading the content from the content providing apparatus through a network in the case of a communication-based content.

According to another embodiment of the present invention, there is provided a program for causing a computer to perform a function including: download means for obtaining download control information necessary for downloading the content from a content providing apparatus in response to a user's operation for selecting a content; on the basis of the obtained download control information, downloading the content by receiving a broadcasting signal in the case of a broadcast-based content, and downloading the content from the content providing apparatus through a network in the case of a communication-based content.

In the content receiving apparatus according to another embodiment, download control information corresponding to a user's operation for selecting a content and necessary for downloading the content is obtained from a content providing apparatus on the basis of the obtained download control information, downloading the content is performed by receiving a broadcasting signal in the case of a broadcast-based content, and downloading the content is performed from the content providing apparatus through a network in the case of a communication-based content.

According to another embodiment of the present invention, there is provided a content downloading system including a content providing apparatus and a content receiving apparatus connected to each other through a network, the system including: the content providing apparatus including content-information providing means for providing content information necessary for specifying a content to be downloaded to the content receiving apparatus, control-information providing means for providing download control information necessary for downloading the content and corresponding to the content specified on the basis of the content information to the content receiving apparatus, delivery means for delivering a broadcast-based content using a broadcasting signal in accordance with a predetermined broadcasting schedule, and content providing means for providing a communication-based content through a network in response to a request from the content receiving apparatus on the basis of the download control information; and the content receiving apparatus including download means for obtaining the download control information necessary for downloading the content from the content providing apparatus in response to a user's operation for selecting a content, on the basis of the obtained download control information, downloading the content by receiving a broadcasting signal in the case of a broadcast-based content, and downloading the content from the content providing apparatus through the network in the case of a communication-based content.

In the content downloading system according to an embodiment of the present invention, the content providing apparatus provides content information necessary for specifying a content to be downloaded to the content receiving apparatus, download control information necessary for downloading the content and corresponding to the content specified is provided on the basis of the content information to the content receiving apparatus, a broadcast-based content using a broadcasting signal is delivered in accordance with a predetermined broadcasting schedule, and a communication-based content through a network in response to a request from the content receiving apparatus on the basis of the download control information; and the content receiving apparatus obtains the download control information corresponding to a user's operation for selecting a content and necessary for downloading the content from the content providing apparatus, on the basis of the obtained download control information, the content is downloaded by receiving a broadcasting signal in the case of a broadcast-based content, and the content is downloaded from the content providing apparatus through the network in the case of a communication-based content.

By an embodiment of the present invention, it is possible to provide a content to a content receiving apparatus by easily using both the Internet and television broadcasting individually as a content communication path for individual purposes.

By another embodiment of the present invention, it is possible to achieve a common operation in a content receiving apparatus no matter whether the Internet or television broadcasting is used for a content communication path.

By another embodiment of the present invention, it is possible to achieve a content download service capable of easily using both the Internet and television broadcasting individually as a content communication path depending on a situation.

BRIEF DESCRIPTION OF THE DRAWINGS

FIG. 1 is a conceptual diagram of a content downloading system to which the present invention is applied;

FIG. 2 is a diagram illustrating timing of download and playback of a communication-based content;

FIG. 3 is a diagram illustrating timing of download and playback of a broadcast-based content;

FIG. 4 is a block diagram illustrating an example of a configuration of a content downloading system;

FIG. 5 is a diagram illustrating a process of encryption and decryption of a content;

FIG. 8 is a diagram illustrating individual phases from downloading a content to playing back, and an overview of a first to a fourth operations;

FIG. 9 is a diagram illustrating an example of a first structure of various kinds of data supplied from a providing apparatus to a receiving apparatus and a relationship therebetween;

FIG. 30 is a block diagram illustrating an example of a configuration of a general-purpose computer.

DESCRIPTION OF THE PREFERRED EMBODIMENTS

Figure 6A:
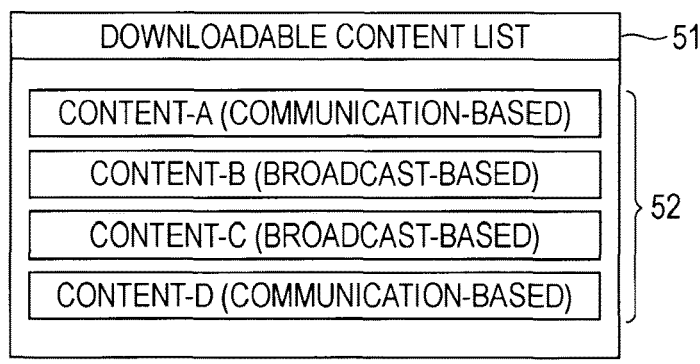
FIG. 6 is a diagram illustrating an example of a display of a downloadable content list, etc.

In the following, a detailed description will be given of a best mode for carrying out the invention (hereinafter, referred to as an embodiment) with reference to the drawings.

In the following, a detailed description will be given of a specific embodiment of the present invention.

FIG. 1 illustrates a basic concept of a content downloading system according to an embodiment of the present invention.

The content downloading system 1 includes a receiving apparatus 10 installed in a user's home where a content is viewed, a communication-based providing apparatus 20A downloading a content from the receiving apparatus 10 connected through a network 2, and a broadcast-based providing apparatus 20B broadcasting a content using a television broadcasting signal.

In this regard, in the present embodiment, download means both processing in which the receiving apparatus 10 transfers electronic data, such as a content, etc., from the communication-based providing apparatus 20A through the network 2 and stores the data, and processing in which the receiving apparatus 10 receives a content broadcast using a television broadcasting signal and stores the content. Also, a content includes AV data for playing back video, the corresponding sound, and the corresponding subtitle data, and is encrypted.

The network 2 is a data communication network typified by the Internet. In this regard, in the content downloading system 1, a content is downloaded and used, and thus it is desirable that the communication speed thereof is high, but is not indispensable.

A satellite 3 relays television broadcasting by the broadcast-based providing apparatus 20B. However, the television broadcasting by the broadcast-based providing apparatus 20B is not limited to satellite broadcasting waves, and may use terrestrial waves or may be through a CATV network. Also, a broadcasting wave other than a television broadcasting wave, for example a digital radio broadcasting wave may be used.

The receiving apparatus 10 is assumed to be built in, for example a television receiver, or externally connected to a television receiver.

The communication-based providing apparatus 20A includes a plurality of servers, etc., disposed on the network 2. The broadcast-based providing apparatus 20B is disposed, for example in a television broadcasting station. Hereinafter, the communication-based providing apparatus 20A and the broadcast-based providing apparatus 20B are put together to be suitably referred to as a providing apparatus 20 (details will be described later with reference to FIG. 4).

As shown in FIG. 2, a user of the receiving apparatus 10 can download (obtain and store) a content-A from the communication-based providing apparatus 20A through the network 2 by the content downloading system 1. After that, the user can play back (view) the content-A stored in the receiving apparatus 10 at any time in a permitted use period.

As shown in FIG. 3, a user of the receiving apparatus 10 can download (receive and store) the content-A broadcast from the broadcast-based providing apparatus 20B by the content downloading system 1. After that, the user can play back (view) the content-A stored in the receiving apparatus 10 at any time in a permitted use period.

Next, a detailed description will be given of an example of configurations of the receiving apparatus 10 and the providing apparatus 20 included in the content downloading system 1.

The receiving apparatus 10 includes a browser 11, a downloader 12, a storage 13, an ECG 14, an AV player 15, a DRM (Digital Rights Management) client 16, and an external output section 17.

The browser 11 accesses the communication-based providing apparatus 20A, obtains an HTML (Hypertext Markup Language) document, a BML (Broadcast Markup Language) document, or the like, and displays a corresponding Web page. Also, the browser 11 displays a Web page which enables the user to interactively perform operations, such as purchase of a package (content goods unit), selection of a content to be downloaded, display of a purchase history, cancel of charging, etc. In particular, the browser 11 presents a downloadable content list 51 (FIG. 6A), which is an interactive user interface displaying a list of download contents to the user and allowing the user to select a content to be downloaded, to the user, and enables the user to select a content to be downloaded.

The downloader 12 transfers a content, etc., from the communication-based providing apparatus 20A as a help application of the browser 11 or the ECG, and outputs the content, etc., to a storage 13. The downloader 12 is started under the control of the browser 11 on the basis of an HTML/BML document 82 (FIG. 9). Also, the downloader 12 is started under the control of the ECG 14 on the basis of ECG meta data 81 (FIG. 9). The downloader 12 obtains download control information 83 (FIG. 9) necessary for downloading a content, etc., from a meta data server 24 of the communication-based providing apparatus 20A. Also, the downloader 12 obtains playback control information 84 (FIG. 9) necessary for playing back a content from the meta data server 24, and stores the information into the storage.

Further, the downloader 12 transfers the encrypted content from the content server 25 of the communication-based providing apparatus 20A on the basis of the obtained download control information 83, and stores the content into the storage 13. Alternatively, the downloader 12 receives the encrypted content broadcast from the broadcast-based providing apparatus 20B using a television broadcasting signal on the basis of the obtained download control information 83, and stores the content into the storage 13.

Further, the downloader 12 generates a meta DB (database) 13A, which is information for presenting a list of contents stored in the storage 13 to the user, on the basis of the obtained ECG meta data 81, and stores the meta DB into the storage 13.

The storage 13 includes a hard disk drive, etc., stores the download control information 83 and the playback control information 84, which were obtained from the meta server 24, and the encrypted content downloaded from the providing apparatus 20. Also, the storage 13 stores the meta DB 13A generated by the downloader 12.

The ECG 14 serves to present a screen display for selecting a content to be downloaded and a screen display for instructing to play back a content to the user. The ECG 14 obtains the ECG meta data 81 (FIG. 9) from the meta server 24 of the communication-based providing apparatus 20A. In the same manner as the above-described browser 11, the ECG 14 presents the downloadable content list 51 (FIG. 6A) to the user on the basis of the obtained ECG meta data 81, and allows the user to select a content to be downloaded. That is to say, the downloadable content list 51 is presented to the user either by the browser 11 or the ECG 14.

Also, the ECG 14 shows a list of contents that have been downloaded and are capable of being played back on the basis of the meta DB 13A held in the storage 13, and presents a local content list 61 (FIG. 7A), which is an interactive user interface allowing the user to select a content to be played back.

The AV player 15 is started by the ECG 14, reads a content to be played back from the storage 13, decrypts the encrypted content using a content key supplied from the DRM client 16, plays back the content, displays on the display video corresponding to the AV data obtained as a result, and outputs sound from a speaker (both of them are not shown in the figure). Also, the AV player 15 outputs the AV data obtained as a playback result to the external output section 17 only if the content is permitted by an RMPI (use condition information) supplied from the DRM client 16.

In this regard, the ECG 14 may include a content, which is in the process of being downloaded, but a predetermined amount of data of which has been buffered, into the local content list 61, and may present the content to the user. And the AV player 15 may play back the content even if the content is in the process of being downloaded, but a predetermined amount of data of which has been buffered (so-called progressive download or streaming playback may be performed).

The DRM client 16 obtains a license including a content key necessary for decrypting an encrypted content from the communication-based providing apparatus 20A. The DRM client 16 establishes a secure path with a DRM server 26 of the communication-based providing apparatus 20A, then obtains a license including a content key from the DRM server 26, and holds the obtained license by itself. In response to a request from the AV player 15, the DRM client 16 supplies the content key to the AV player 15 only if a use condition described in the license is satisfied.

The external output section 17 converts the AV data supplied from the AV player 15 into a specified format of an output destination (a removable medium, a playback apparatus, a recording apparatus, etc.), and outputs the data.

The providing apparatus 20 includes the communication-based providing apparatus 20A and the broadcast-based providing apparatus 20B.

The communication-based providing apparatus 20A includes a Web server 21, a customer management server 22, a charge•settlement server 23, a meta data server 24, a content server 25, and a DRM server 26.

The Web server 21 functions as a portal site of a content download service, and supplies an HTML document, a BML document, etc., for displaying various interactive Web pages on the receiving apparatus 10 to the browser 11.

The customer management server 22 manages information on a customer of the content download service, and manages customer information (for example, a customer-ID, a password, settlement information (a bank account, a credit card number, etc.), a device-ID of the receiving apparatus 10, a DRM client ID (DRM ID)) of a customer (a user of the receiving apparatus 10) in connection with purchase history information indicating packages (product units) purchased by each customer and download history information indicating a downloaded content, etc.

The charge•settlement server 23 settles an account at the time of using a content download service, and performs charge•settlement processing on the customer in response to a request from the customer management server 22.

In this regard, in this specification, a term of "purchase" includes a meaning of an agreement. That is to say, the term, purchase, is used, for example, when a customer makes an agreement of a package on the condition that allows the customer to download any number of contents at a fixed monthly charge.

Also, a term of "charge" includes a meaning that a use of a credit card has been determined in response to the purchase of a package and a meaning that a predetermined amount of money is actually paid from a user's account, etc. Accordingly, "cancel charge" described below means that a determination of the use of a credit card in response to the purchase of a package is canceled, and the amount of money paid from the user's account is refund.

The meta data server 24 serves to transfer the download control information 83 and the playback control information 84, which corresponds to the content, to the receiving apparatus 10. The meta data server 24 manages information on a package (content product unit) and a content, and supplies necessary information to another server. Also, the meta data server 24 transfers the download control information 83 and the playback control information 84 to the downloader 12 in response to a request from the downloader 12 of the receiving apparatus 10. Also, the meta data server 24 supplies the ECG meta data 81 corresponding to each downloadable content in response to a request from the ECG 14 of the receiving apparatus 10.

The content server 25 serves to transfer a content to the receiving apparatus 10, and transfers an encrypted content to the downloader 12 in response to a request from the downloader 12 of the receiving apparatus 10.

The DRM server 26 serves to supply a license to the DRM client 16 of the receiving apparatus 16, establishes a secure communication path with the DRM client 16 of the receiving apparatus 10, and then supplies a license including a content key for decrypting an encrypted content to the DRM client 16.

The broadcast-based providing apparatus 20B includes a content delivery section 27. The content delivery section 27 broadcasts an encrypted content using a television broadcasting signal in accordance with a predetermined broadcasting schedule.

In this regard, the servers from the Web server 21 to the DRM server 26 included in the communication-based providing apparatus 20A may be disposed by being centered on the network 2, or may be disposed distributedly. Also, some of the servers from the Web server 21 to the DRM server 26 may be combined to constitute a server.

Next, a description will be given of a content to be downloaded by the receiving apparatus 10 with reference to FIG. 5.

AV data forming a content is subjected to compression coding using a predetermined coding system (for example, the MPEG2 system) by the content server 25 of the communication-based providing apparatus 20A or the content delivery section 27 of the broadcast-based providing apparatus 20B. After that, the AV data is changed into a transport stream (TS) together with subtitle data, etc., and then is encrypted by a content key generated by the DRM server 26 to be transferred to the receiving apparatus 10 or is broadcast using a television broadcasting signal. And the content obtained by the receiving apparatus 10 is stored in the storage 13.

The content key for decrypting the encrypted content in the receiving apparatus 10 is supplied from the DRM server 26 of the communication-based providing apparatus 20A to the DRM client 16 of the receiving apparatus 10 separately from the content in a state of being included in the license together with the RMPI (including use condition information, copy control information, etc.).

The content encrypted for each TS packet, which is stored in the storage 13, is decrypted by the content key supplied from the DRM client 16 by the AV player 15, and an MPEG2-TS obtained as a result is decoded. However, supplying the content key from the DRM client 16 is limited to the case where a use condition (use period, number of playback times, etc.) described in the license is satisfied.

Here, a description will be given of a downloadable content list 51 which is presented to the user by either the browser 11 or the ECG 14.

As described above, the downloadable content list 51 shows a list of the downloadable contents, and is displayed as shown in FIG. 6A, for example. That is to say, in the downloadable content list 51, communication-based contents supplied from the communication-based providing apparatus 20A and broadcast-based contents broadcast from the broadcast-based providing apparatus 20B are mixedly displayed without being distinguished.

In this regard, in an example in FIG. 6A, in order to explain that the communication-based contents and the broadcast-based contents are mixedly displayed without being distinguished, characteristic strings "communication-based" and "broadcast-based" are shown in the figure. However, they are actually not shown. Thus, the user can select a content without being aware of whether the content is communication-based or broadcast-based. However, it may be possible to display a communication-based content and a broadcast-based content in an identifiable way.

Figure 6B:
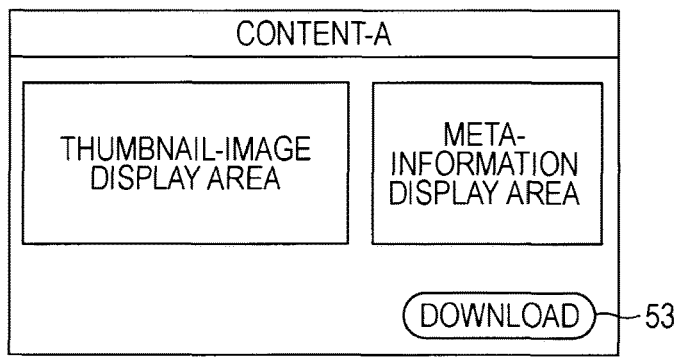

In the downloadable content list 51, when the user selects a content, as shown in FIG. 6B, the screen display is changed to a screen including information on a selected content and a download button 53. In this regard, if the selected content is broadcast based, a broadcasting schedule (broadcast stream, broadcasting date and time, etc.) is also displayed. Here, if the download button 53 is operated by the user, the screen display is changed as shown in FIG. 6C or FIG. 6D.

Figure 6C:
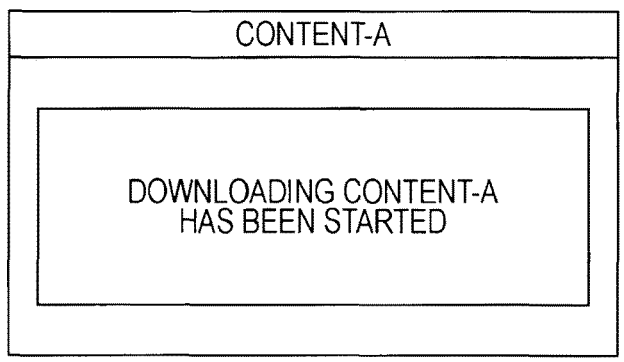

That is to say, if a content selected by the user to be downloaded is communication based, the downloader 12 is started immediately, and the content acquisition is started, changing the screen display as shown in FIG. 6C.

Figure 6D:
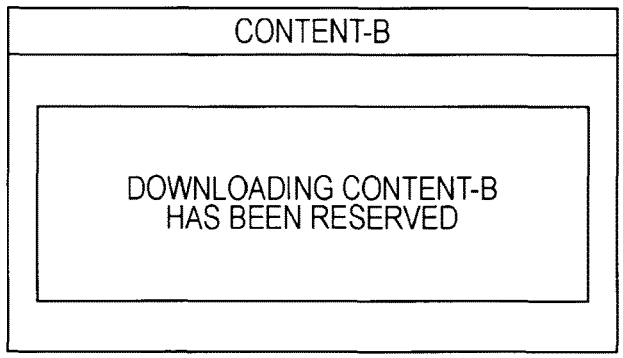

On the contrary, if a content selected by the user to be downloaded is broadcast based, downloading the content is reserved, and the screen display is changed to a screen as shown in FIG. 6D. When the content is broadcast, the downloader 12 is started, and the content is received and stored.

Next, a description will be given of a local content list 61 to be presented to the user by the ECG 14.

Figure 7A:
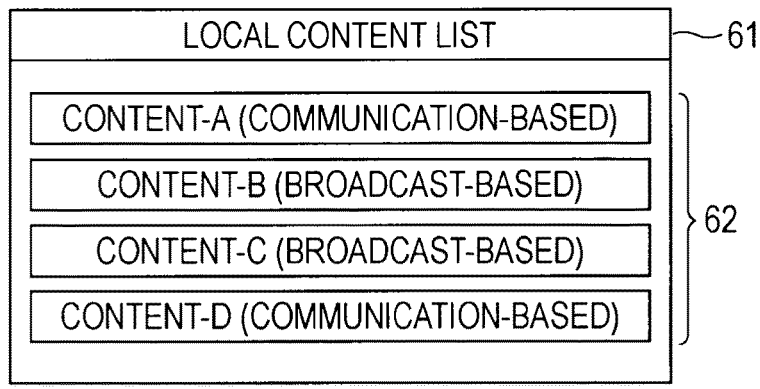
FIG. 7 is a diagram illustrating an example of a display of a local content list, etc.

As described above, the local content list 61 shows a list of contents that have been downloaded and can be played back. For example, the local content list 61 is displayed as shown in FIG. 7A. That is to say, in the local content list 61, communication-based contents and broadcast-based contents stored in the storage 13 are mixedly displayed without being distinguished.

In this regard, in an example in FIG. 7A, in order to explain that the communication-based contents and the broadcast-based contents are mixedly displayed without being distinguished, characteristic strings "communication-based" and "broadcast-based" are shown in the figure. However, they are actually not shown. Thus, the user can select a content without being aware of whether the content to be played back and viewed is communication-based or broadcast-based. However, it may be possible to display a communication-based content and a broadcast-based content in an identifiable way.

Figure 7B:
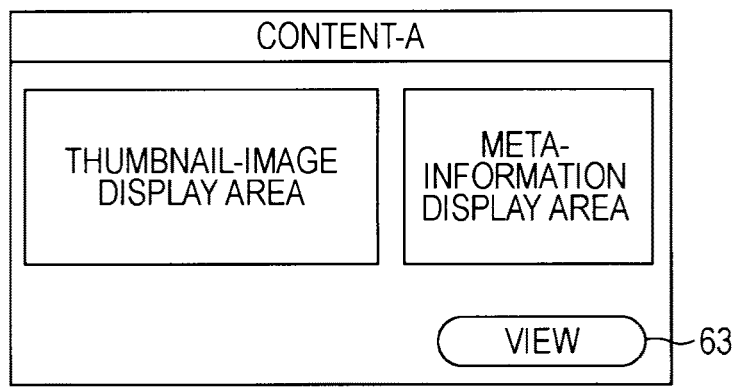
Figure 7C:
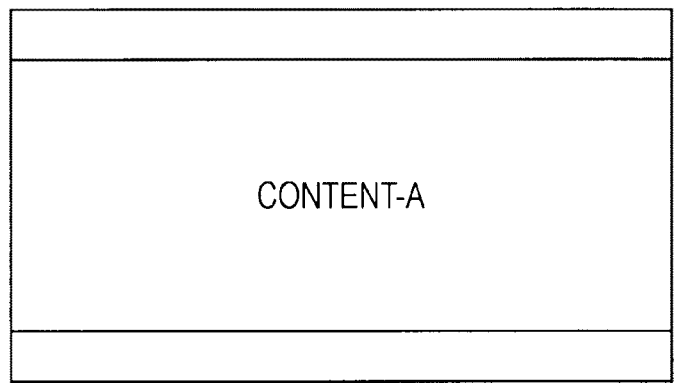

In the local content list 61, when the user selects a content, as shown in FIG. 7B, the screen display is changed to a screen including a view button 63. Here, if the view button 63 is operated by the user, the selected content is started to be played back, and the screen display is changed to display a content played back as shown in FIG. 7C.

Next, a description will be given of an overview of a processing sequence from downloading a content to playing back the content with reference to FIG. 8.

The processing sequence from downloading a content to playing back the content is divided into a download navigation phase, a download phase, a local navigation phase, and a content playback phase.

In the download navigation phase, a downloadable content list 51 is displayed by the browser 11 on the basis of an HTML/BML document, or a downloadable content list 51 is displayed by the ECG 14 on the basis of the ECG meta data. And the user operation for selecting a content to be downloaded is accepted using the downloadable content list 51.

In the download phase, a content is downloaded by the downloader 12. That is to say, in the case of a communication-based content, the content is obtained from the content server 25, and is stored. In the case of a broadcast-based content, the content is obtained by receiving a television broadcasting signal, and is stored. And when the download of the content is completed, a license is obtained (is sometimes not obtained).

In the local navigation phase, the ECG 14 displays the local content list 61 on the basis of the meta DB 13A, and a user's operation of selecting a content to be played back is performed using the local content list 61.

In the content playback phase, the content is decoded and played back. At this time, if a necessary license has not been obtained, the necessary license is obtained, and then the content is decoded and played back.

As described above, two ways of operations are possible for the download navigation phase and the download phase individually. If these phases are combined, four ways of operations are assumed from the download navigation phase to the download phase.

That is to say, a first assumed operation is an operation in which a downloadable content list 51 is displayed by the browser 11 on the basis of an HTML/BML document in the download navigation phase, and a communication-based content is downloaded in the download phase.

A second assumed operation is an operation in which a downloadable content list 51 is displayed by the ECG 14 on the basis of the ECG meta data 81, and a communication-based content is downloaded in the download phase.

A third assumed operation is an operation in which a downloadable content list 51 is displayed by the browser 11 on the basis of an HTML/BML document in the download navigation phase, and a broadcast-based content is downloaded in the download phase.

A fourth assumed operation is an operation in which a downloadable content list 51 is displayed by the ECG 14 on the basis of the ECG meta data 81, and a broadcast-based content is downloaded in the download phase.

In this regard, a detailed description will be given of the first to the fourth operations later with reference to FIGS. 12 to 19.

Next, a description will be given of a relationship between various kinds of data obtained by the receiving apparatus 10 from the providing apparatus 20 with reference to FIG. 9.

The ECG meta data 81 is obtained by the ECG 14 from the meta data server 24. The ECG meta data 81 includes content meta data 81A corresponding to each content with a one-to-one relationship and instance meta data 81B.

The content meta data 81A includes a content-ID, a content title, etc.

For the instance meta data 81B, either of the two kinds of meta data, instance meta data 81B-1 or instance meta data 81B-2, is used.

The instance meta data 81B-1 is used when the download control information 83 described below is described in a first format, that is to say, when the format of the download control information 83 corresponding to a communication-based content and the format of the download control information 83 corresponding to a broadcast-based content are common.

In contrast, the instance meta data 81B-2 is used when the download control information 83 is described in a second format (for a communication-based content), or in a third format (for a broadcast-based content).

The instance meta data 81B-1 includes an instance-meta-data-ID, a content-ID, a reference destination (specific information of the download control information and the acquisition destination thereof) of the download control information necessary for downloading a content corresponding to the content-ID, and an expiration date of the instance meta data.

A description will be given of the instance meta data 81B-2 with reference to FIG. 22.

In the same manner as the instance meta data 81B, for the HTML/BML document 82, either of the two kinds of documents, an HTML/BML document 82-1 or an HTML/BML document 82-2, is used.

The HTML/BML document 82-1 is used when the download control information 83 described below is described in a first format, that is to say, when the format of the download control information 83 corresponding to a communication-based content and the format of the download control information 83 corresponding to a broadcast-based content are common.

In contrast, the HTML/BML document 81B-2 is used when the download control information 83 is described in a second format (for a communication-based content), or in a third format (for a broadcast-based content).

The HTML/BML document 82-1 is obtained by the browser 11 from the Web server 21. The HTML/BML document 82-1 includes a function for starting the downloader 12 and a reference destination (specific information of the download control information and the acquisition destination thereof) of the download control information necessary for downloading a content selected by the user as an argument.

A description will be given later of the HTML/BML document 82-2 with reference to FIG. 22.

The download control information 83 is obtained by the downloader 12, which is started under the control of the browser 11 or the ECG 14, from the meta data server 24. The download control information 83 includes a download unit-ID, a title for each download unit, an acquisition destination of a license, each content information (including an acquisition destination of playback control information), etc.

In this regard, a detailed description will be given later of the contents of the download control information 83, which is a feature of the present invention, with reference to FIGS. 10 and 11.

The playback control information 84 is obtained by the downloader 12 from the meta data server 24 on the basis of the download control information 83. The playback control information 84 includes a content-ID, a license-ID, a license acquisition destination, etc.

The license 85 is obtained by the DRM client 16 from the DRM server 26 on the basis of the playback control information. The license 85 includes a content key and use condition information.

Next, a detailed description will be given of the first format of the download control information 83. The first format of the download control information 83 can be commonly used for a communication-based content and a broadcast-based content.

Figure 10:
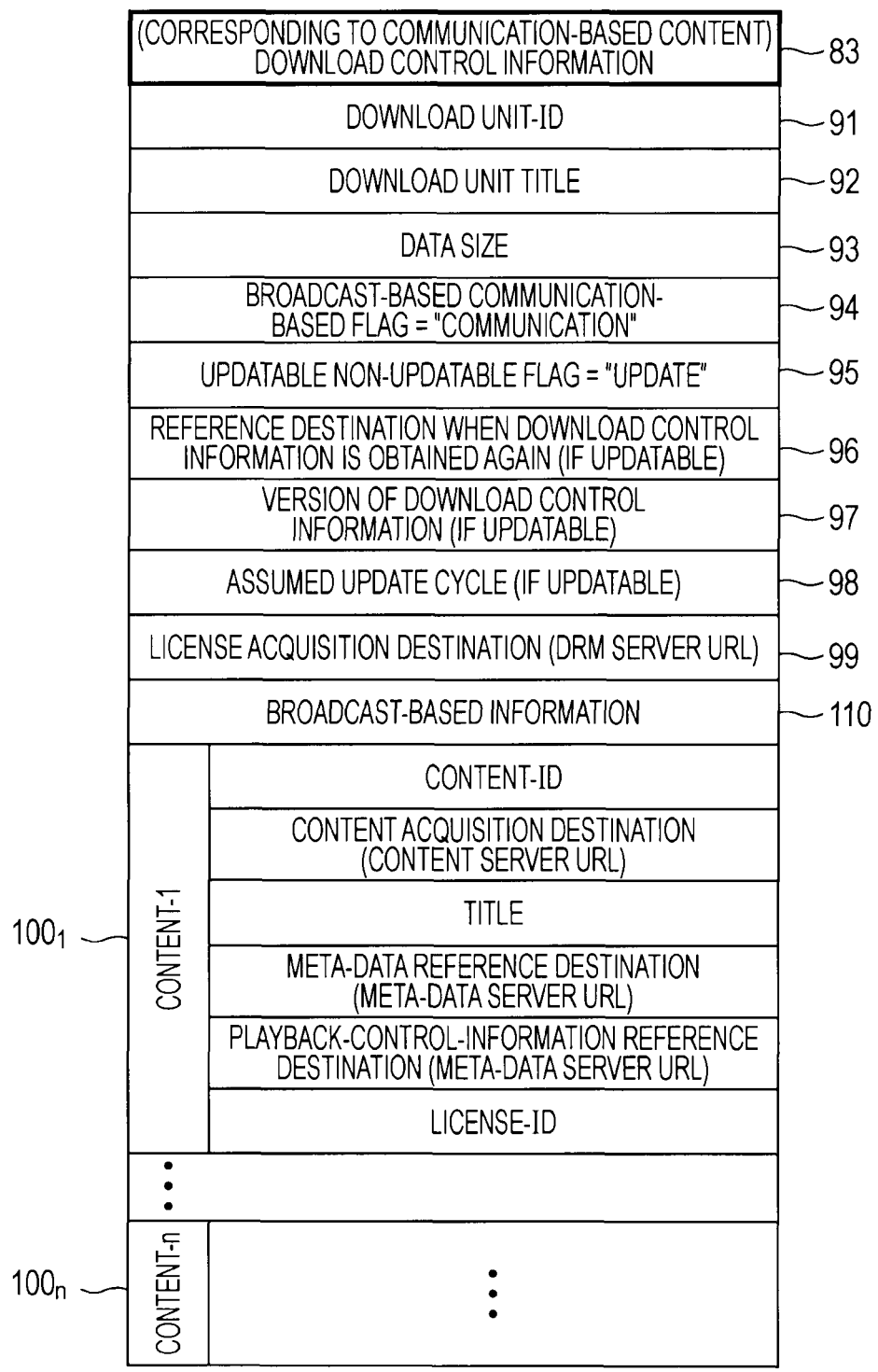
FIG. 10 is a diagram illustrating an example of download control information corresponding to a communication-based content.

FIG. 10 illustrates an example of a structure of the download control information 83 corresponding to a communication-based content. The download control information 83 corresponding to a communication-based content includes a download unit-ID 91, a download unit title 92, a data size 93, a broadcast-based•communication-based flag 94, an updatable•non-updatable flag 95, a reference destination of when the download control information is obtained again 96, a version of the download control information 97, a assumed update cycle 98, a license acquisition destination 99, broadcast-based•information 110, and each content information 100.

The download unit-ID 91 is identification information for each download unit. Here, the download unit includes one content or more. For example, a plurality of contents corresponding to a series of movies, a drama including a plurality of stories, or the like is regarded as one download unit. By providing a download unit, it is possible to download a plurality of related contents consecutively as a group.

The download unit title 92 is a name assigned to a download unit. The data size 93 is information indicating a data size for an individual download unit.

The broadcast-based•communication-based flag 94 is information indicating whether a content included in the download unit is broadcast based or communication based. The first format of the download control information 83 characteristically includes the broadcast-based•communication-based flag 94.

The updatable•non-updatable flag 95 is information indicating whether the download unit is updated periodically or not.

The reference destination 96 of the download control information is described when the download unit is updatable, and is information indicating a reference destination of the download control information (the next version of the download control information to that download control information) necessary for downloading the download unit after update.

The version of the download control information 97 is described when the download unit is updatable, and is information indicating a version of the download control information. The assumed update cycle 98 is information indicating an assumed update cycle.

The license acquisition destination 99 is information indicating an acquisition destination (the URL of the DRM server 26) of the license corresponding to the download unit. If the license acquisition destination 99 is described, a license is obtained when downloading the download unit is completed.

In this regard, a license obtained here may be a dummy license (a license that is not allowed to decrypt a content). By an acquisition request of the dummy license, it is possible for the providing apparatus 20 to determine the completion of the download. On the contrary, if the license acquisition destination 99 is not described, a license is not obtained when the download of the download unit has completed, and the license is obtained at the time of playback.

The broadcast-based•information 110 is described when the download control information 83 is corresponding to a broadcast-based content, and is not described when the download control information 83 is corresponding to a communication-based content.

Each content information 100 is described for a number n of the contents forming a download unit. First content information $100_1$ includes a content-ID, a content acquisition destination (the URL of the content server 25), a content title, a reference destination of the ECG meta data 81 corresponding to the content (the URL of the meta data server 24), a reference destination of the playback control information 84 (the URL of the meta data server 24) and a license-ID. The same applies to second to n-th content information $100_2$ to $100_n$, and thus the description thereof will be omitted.

Figure 11:
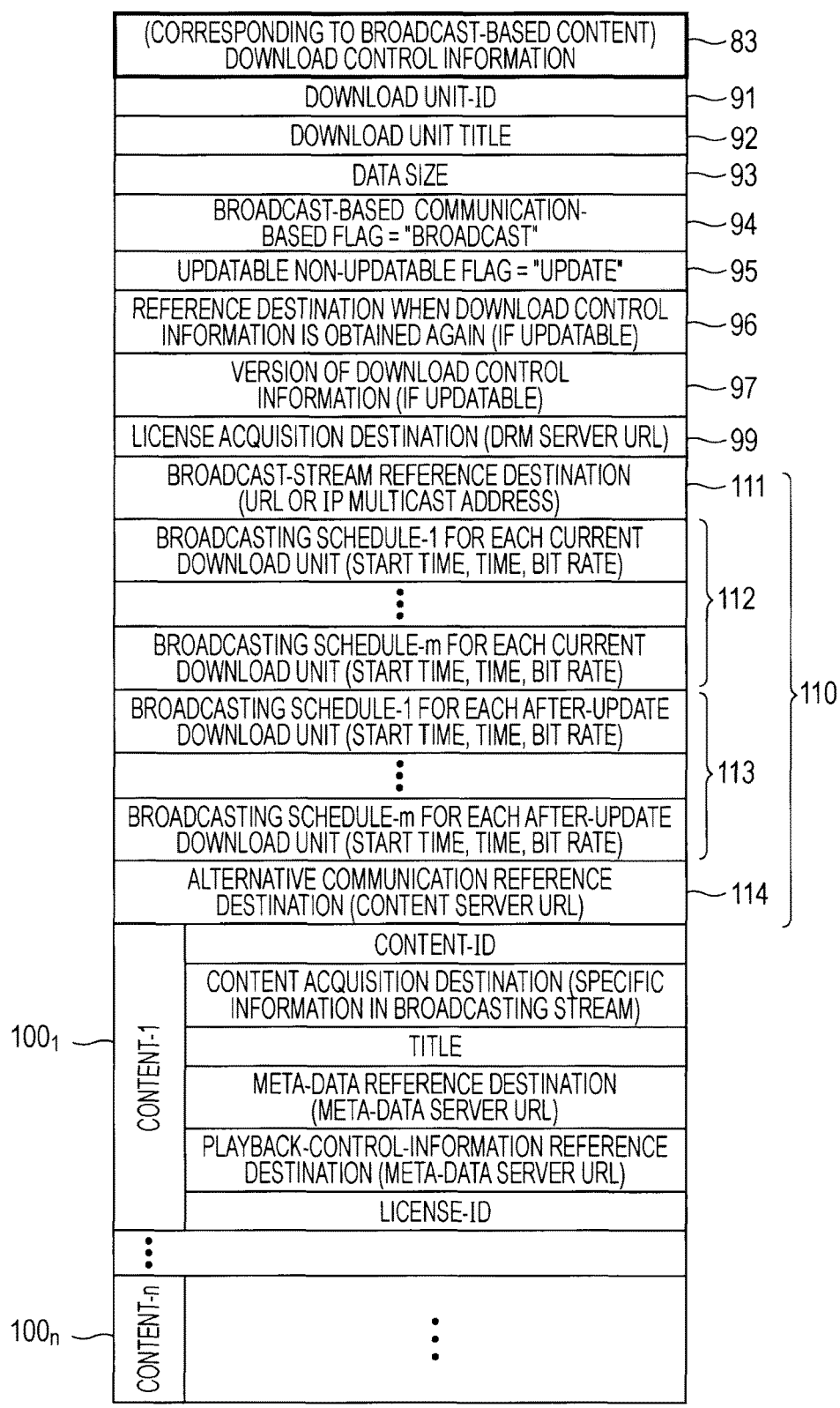
FIG. 11 is a diagram illustrating an example of download control information corresponding to a broadcast-based content.

FIG. 11 shows an example of a structure of the download control information 83 corresponding to a broadcast-based content. In the same manner as the download control information 83 corresponding to a communication-based content, the download control information 83 corresponding to a broadcast-based content includes a download unit-ID 91, a download unit title 92, a data size 93, a broadcast-based•communication-based flag 94, an updatable•non-updatable flag 95, a reference destination of when the download control information is obtained again 96, a version of the download control information 97, a license acquisition destination 99, broadcast-based•information 110, and each content information 100.

The broadcast-based•information 110 is divided into a broadcast-stream reference destination 111, a broadcasting schedule 112 of the current download unit, a broadcasting schedule 113 of the download unit after update, an alternative-communication reference destination 114, and each content information 100.

The broadcast-stream reference destination 111 is information for identifying a broadcast stream broadcasting a content. The broadcast-stream reference destination 111 is described, for example using a URL (Uniform Resource locator) which is defined by ARIB (Association of Radio Industries and Businesses) or an IP (Internet Protocol) multicast address.

The broadcasting schedule 112 includes broadcasting time of each broadcasting schedule including rebroadcasting a content, necessary time, and a bit rate. In particular, by including a bit rate of each broadcasting schedule, for example, it is possible to support operation so as to increase a bit rate at midnight, etc., when a normal television program is not broadcast.

The broadcasting schedule 113 of the download unit after update is information described when the download unit is updatable. The broadcasting schedule 113 includes broadcasting time, necessary time, a bit rate of individual broadcasting schedule including re-broadcasting a content after update. By describing the broadcasting schedule 113 of the download unit after update in the download control information 83, it is possible to prepare for broadcasting of the download unit after update.

The alternative-communication reference destination 114 is information indicating a URL in the content server 25 which allows acquisition of the same download unit when the broadcasting of the current download unit has already been completed.

Each content information 100 is described for a number n of the contents forming a download unit. First content information $100_1$ includes a content-ID, a content acquisition destination (specific information in a broadcast stream), a content title, a reference destination (the URL of the meta data server 24) of the playback control information 84, and a license-ID. The same applies to second to n-th content information $100_2$ to $100_n$, and thus the description thereof will be omitted.

Next, a description will be given of the first to the fourth assumed operations from the download navigation phase to the download phase shown in FIG. 8.

In this regard, on the assumption of the first to fourth operations, it is assumed that the user of the receiving apparatus 10 has completed registration for using the service to the content-download service administrator. Thereby, the user information of the receiving apparatus 10 is registered in the customer management server 22 of the receiving apparatus 20. Further, purchase history information indicating purchased packages and download history information indicating downloaded contents are managed in connection with the user.

Figure 12:
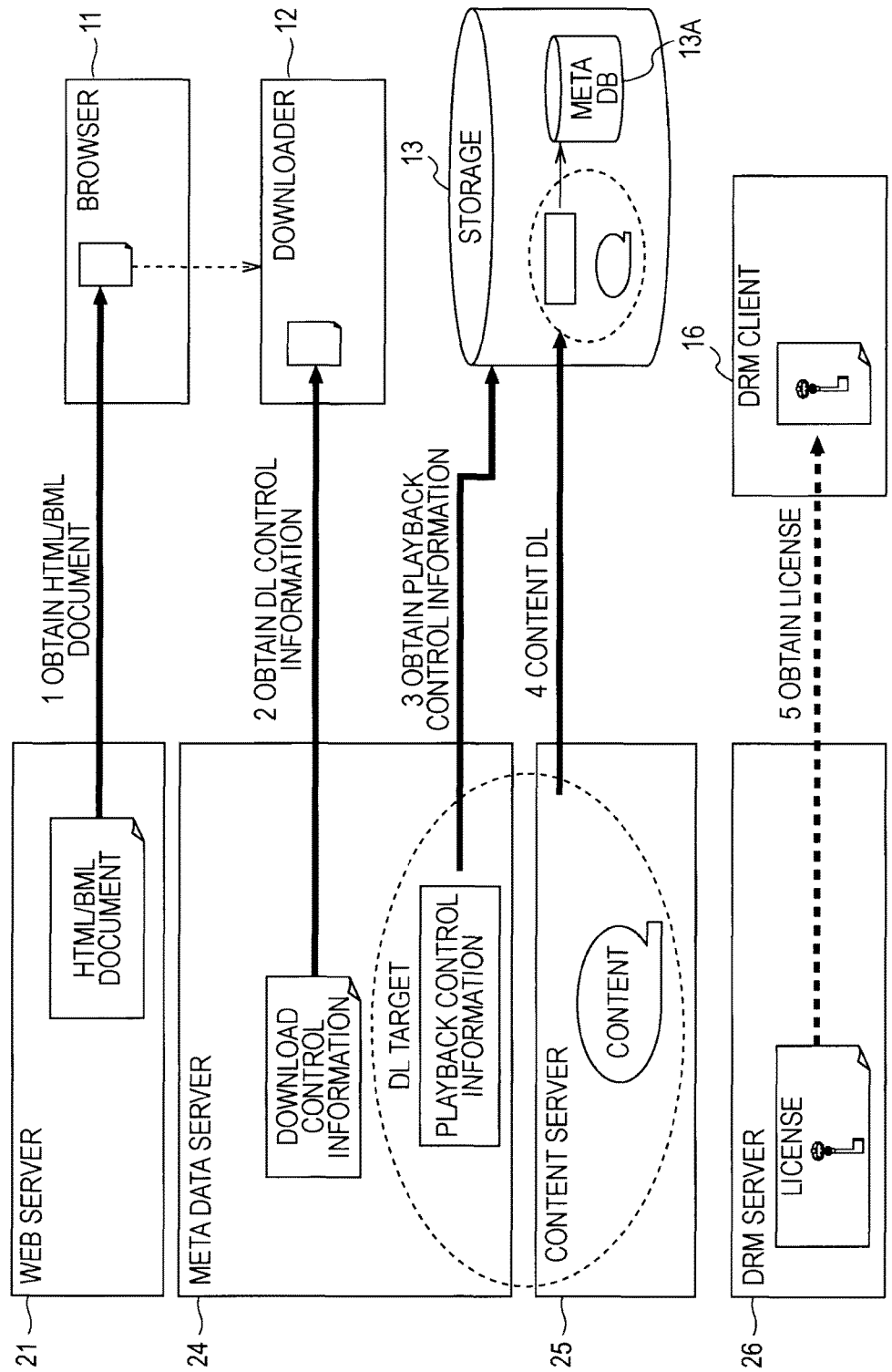
FIG. 12 is a diagram illustrating an overview of a first operation.

FIG. 12 shows an overview of the first operation in which a downloadable content list 51 is displayed by the browser 11 on the basis of an HTML/BML document in the download navigation phase, and a communication-based content is downloaded in the download phase.

The browser 11 of the receiving apparatus 10 accesses the Web server 21 of the providing apparatus 20 in response to a predetermined operation by the user, and obtains the HTML/BML document 82. The browser 11 presents the downloadable content list 51 to the user as a Web page on the basis of the obtained HTML/BML document 82. When the user operates on the downloadable content list 51 to select the content by the download unit, the downloader 12 is started.

The started downloader 12 obtains the download control information 83 corresponding to the download unit of the selected content from the meta server 24. In this regard, the URL of the meta server 24, which is the reference destination of the download control information 83 obtained here is described in the HTML/BML document 82 obtained before.

The downloader 12 which has obtained the download control information 83 transfers the playback control information 84 from the meta server 24 in accordance with the contents described in the download control information 83, and stores the information into the storage 13. Also, the downloader 12 transfers the content from the content server 25 in accordance with the contents described in the download control information 83, and stores the content into the storage 13. Further, the downloader 12 generates a meta DB 13A for generating a local content list on the basis of the transferred playback control information 84, and stores the list into the storage 13.

Further, the downloader 12 requests the DRM client 16 to obtain the license if the license acquisition destination 99 is described in the download control information 83. The DRM client 16 requests and obtains the license from the DRM server 26 in accordance with the contents described in the download control information 83 obtained by the downloader 12. Now, the description of the overview of the first operation has been completed.

Figure 13:
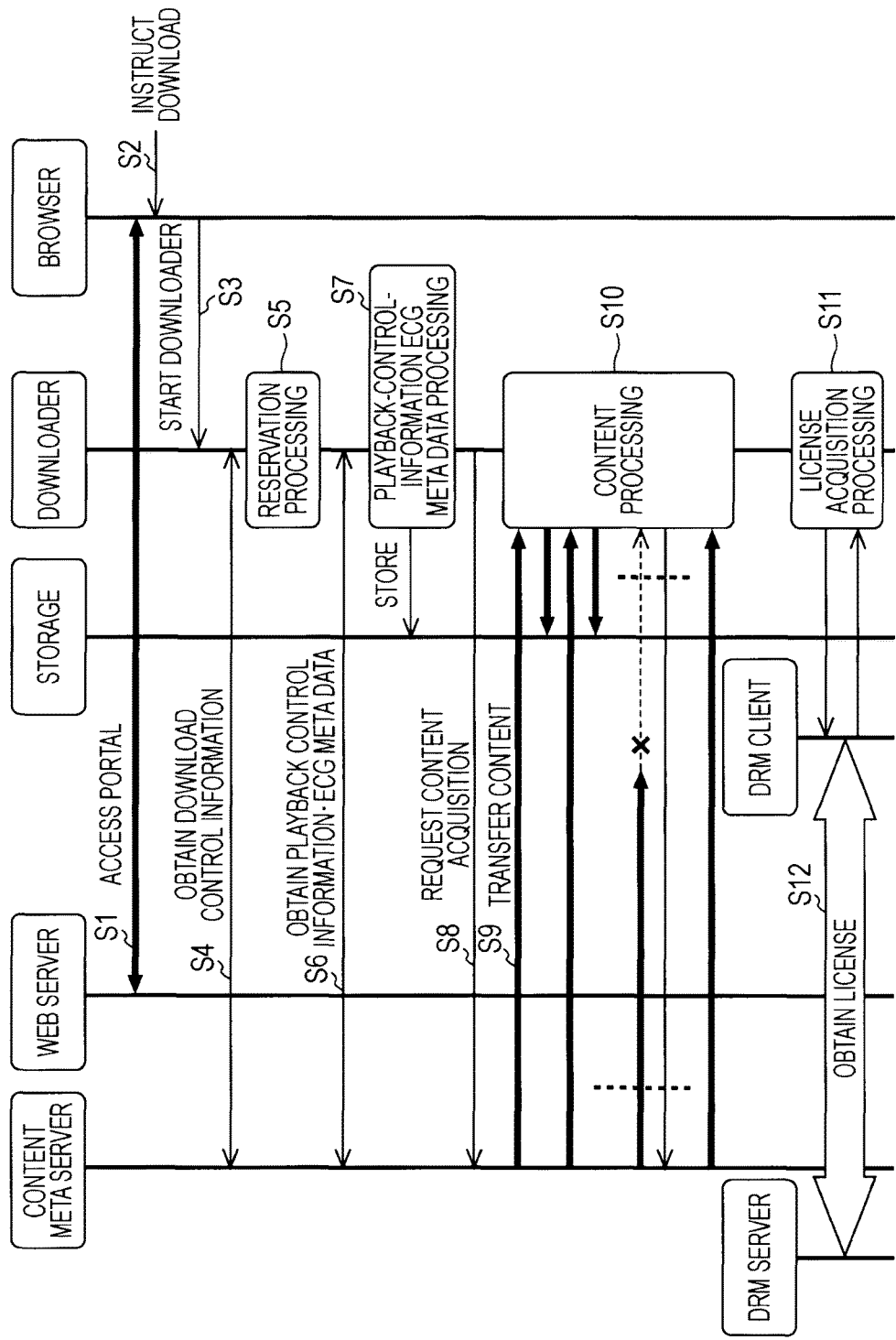
FIG. 13 is a timing chart illustrating the first operation.

Next, a detailed description will be given of the first operation with reference to a timing chart in FIG. 13. In this regard, the meta data server 24 and the content server 25 are integrally shown in FIG. 13, the same illustration is sometimes applied to the following drawings appropriately.

The assumption of the first operation is the same as the above description of the overview. First, in step S1, the browser 11 of the receiving apparatus 10 accesses the Web server 21 of the providing apparatus 20, and performs authentication of a user. After that, the browser 11 obtains the HTML/BML document 82 for displaying a Web page. Further, the browser 11 presents the downloadable content list 51 to the user on the basis of the obtained HTML/BML document 82. In step S2, when the user selects a content from the downloadable content list 51, which can be operated interactively, and operates an instruction to perform downloading, the browser 11 starts the downloader 12, which is a help application, in step S3.

The started downloader 12 obtains, from the meta data server 24, the download control information 83 corresponding to the download unit including the selected content on the basis of the URL of the meta server 24 indicating the acquisition destination of the download control information 83 notified from the browser 11 in step S4, and stores the information into the storage 13.

In step S5, the downloader 12 performs initial processing in which the obtained download control information 83 is analyzed, download timing is checked, free space of the storage 13 is checked after getting a data size of the content to be downloaded, and a directory is created in the storage 13.

In step S6, the downloader 12 accesses the meta data server 24 on the basis of the reference destination of the playback control information described in each content information 100 of the download control information 83, and obtains individual playback control information 84 and ECG meta data 81 corresponding to all the contents included in the selected download unit. In step S7, the downloader 12 generates the meta DB 13A, and stores the DB together with the playback control information 84 into the storage 13.

In step S8, the downloader 12 accesses the content server 25 on the basis of the content-ID and the content acquisition destination described in each content information 100 of the download control information 83, and makes a request for transferring individual contents included in the selected download unit. In step S9, the content server 25 starts to transfer the requested content in response to this request, and the downloader 12 stores the transferred content into the storage 13 in step S10.

Next, after the download of all the contents included in the download unit has been completed, the downloader 12 requests the DRM client 16 to obtain a license in step S11. In step S12, the DRM client 16 accesses the DRM server 26 on the basis of the license acquisition destination 99 described in the download control information 83, obtains the license after authentication processing including notification of a DRM-ID, holds the obtained license by the DRM client 16, and notifies the acquisition of the license to the downloader 12. In this regard, the license obtained here corresponds to the license acquisition destination 99 described in the download control information 83. The license may be a true license (license available for playback), or may be a dummy license (license substantially unavailable for playback).

In this regard, the DRM server 26 notifies the customer management server 22 that the DRM client 16 has made a request for license. The customer management server 22 confirms that the receiving apparatus 10 has completed the downloading of the content on the ground of having received the notification from the DRM server 26, and causes the charge•settlement server 23 to perform charging and settling on the customer. The detailed description of the first operation has been completed.

Figure 14:
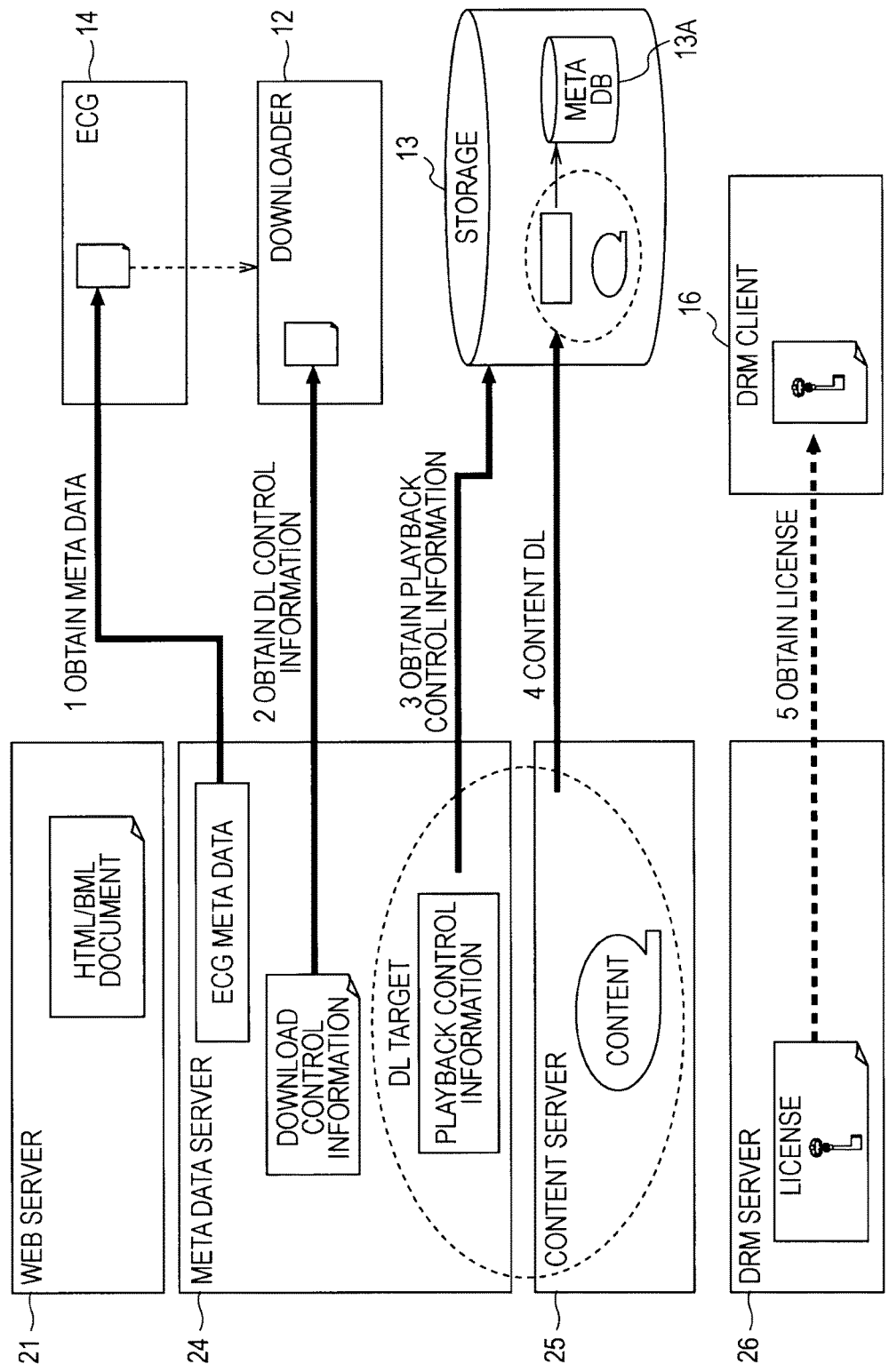
FIG. 14 is a diagram illustrating an overview of a second operation.

Next, FIG. 14 shows an overview of the second operation in which a downloadable content list 51 is displayed by the ECG 14 on the basis of ECG meta data 81 in the download navigation phase, and a communication-based content is downloaded in the download phase.

The ECG 14 of the receiving apparatus 10 accesses the meta data server 24 of the providing apparatus 20 periodically or in response to an instruction of the user, and obtains the ECG meta data 81 of a downloadable content. The ECG 14 presents the downloadable content list 51 to the user on the basis of the ECG meta data 81. When the user operates on downloadable content list 51 to select the content by the download unit, the downloader 12 is started.

The started downloader 12 obtains the download control information 83 corresponding to the download unit of the selected content from the meta server 24. In this regard, the URL of the meta server 24, which is the reference destination of the download control information 83 obtained here is described in the instance meta data 81B included in the obtained ECG meta data 81.

The downloader 12, which has obtained the download control information 83, transfers the playback control information 84 from the meta server 24 in accordance with the contents described in the download control information 83, and stores the information into the storage 13. Also, the downloader 12 transfers the content from the content server 25 in accordance with the in accordance with the contents described in the download control information 83, and stores the content into the storage 13. Further, the downloader 12 generates a meta DB 13A for generating a local content list on the basis of the transferred playback control information 84, and stores the list into the storage 13.

Further, the downloader 12 requests the DRM client 16 to obtain the license if the license acquisition destination 99 is described in the download control information 83. The DRM client 16 requests and obtains the license from the DRM server in accordance with the contents described in the download control information 83 obtained by the downloader 12. Now, the description of the overview of the second operation has been completed.

Figure 15:
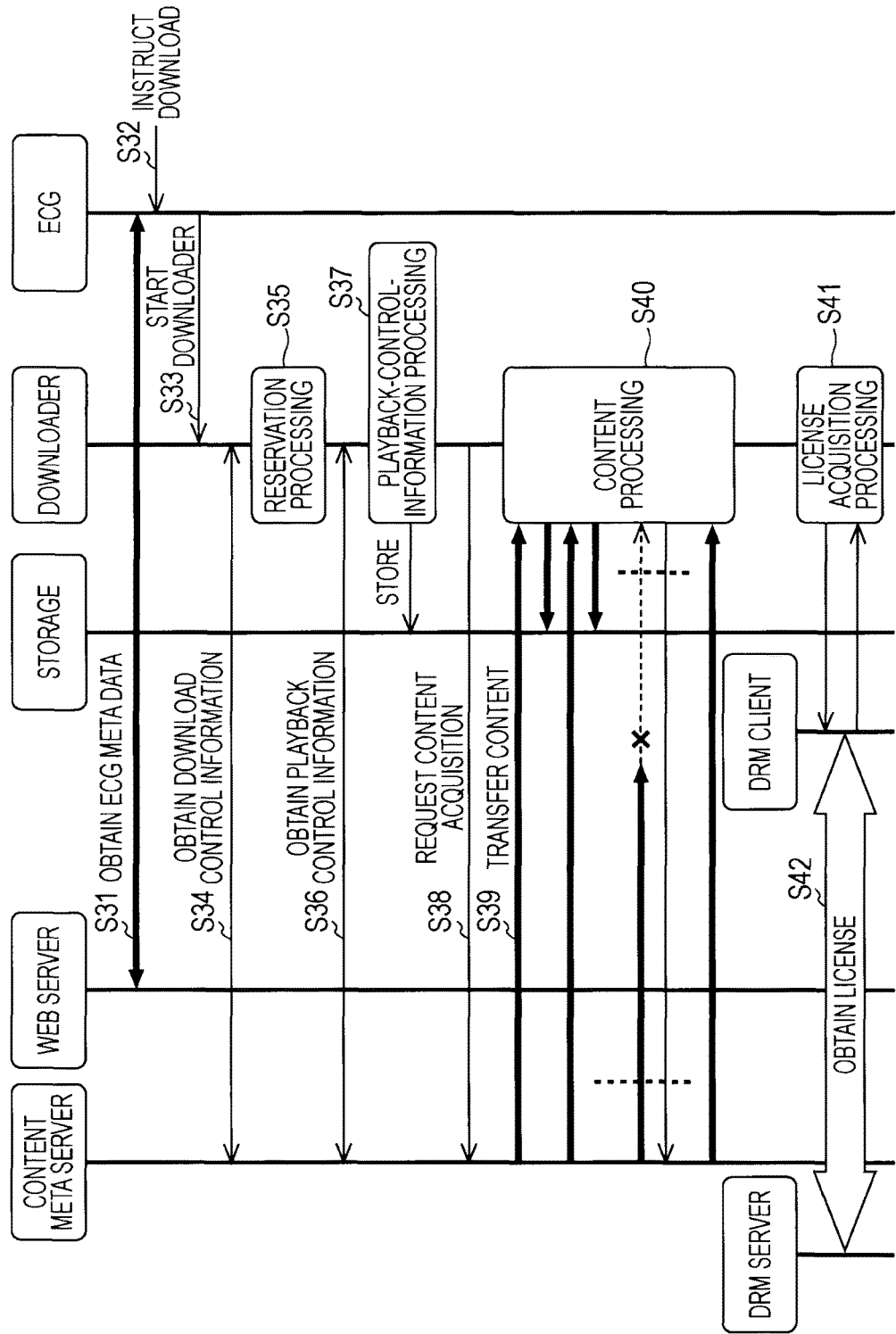
FIG. 15 is a timing chart illustrating the second operation.

Next, a detailed description will be given of the second operation with reference to a timing chart in FIG. 15.

The assumption of the second operation is the same as the above description of the overview. First, in step S31, the ECG 14 of the receiving apparatus 10 obtains the ECG meta data 81 of the downloadable contents from the meta data server 24 of the providing apparatus 20 periodically or in response to the user's operation. And the ECG 14 presents the downloadable content list 51 to the user on the basis of the obtained ECG meta data 81 in response to the instruction from the user. In step S32, when the user selects a content from the downloadable content list 51, which can be operated interactively, and operates to instruct to perform downloading, the ECG 14 starts the downloader 12, which is a help application, in step S33.

The started downloader 12 obtains, from the meta data server 24, the download control information 83 corresponding to the download unit including the selected content on the basis of the URL of the meta server 24 indicating the acquisition destination of the download control information 83 notified from the ECG 14 in step S34, and stores the information into the storage 13.

In step S35, the downloader 12 performs initial processing in which the obtained download control information 83 is analyzed, download timing is checked, free space of the storage 13 is checked after getting a data size of the content to be downloaded, and a directory is created in the storage 13.

In step S36, the downloader 12 accesses the meta data server 24 on the basis of the reference destination of the playback control information described in each content information 100 of the download control information 83, and obtains individual playback control information 84 corresponding to all the contents included in the selected download unit. In step S7, the downloader 12 generates the meta DB 13A, and stores the DB together with the playback control information 84 into the storage 13.

In step S38, the downloader 12 accesses the content server 25 on the basis of the content-ID and the content acquisition destination described in each content information 100 of the download control information 83, and makes a request for transferring individual contents included in the selected download unit. In step S39, the content server 25 starts to transfer the requested content in response to this request, and the downloader 12 stores the transferred content into the storage 13 in step S40.

Next, after the downloading of all the contents included in the download unit has been completed, the downloader 12 requests the DRM client 16 to obtain a license in step S41. In step S42, the DRM client 16 accesses the DRM server 26 on the basis of the license acquisition destination 99 described in the download control information 83, obtains the license after authentication processing including notification of a DRM-ID, etc., holds the obtained license by the DRM client 16, and notifies the acquisition of the license to the downloader 12. In this regard, the license obtained here corresponds to the license acquisition destination 99 described in the download control information 83. The license may be a true license, or may be a dummy license.

In this regard, the DRM server 26 notifies the customer management server 22 that the DRM client 16 has made a request for license. The customer management server 22 confirms that the receiving apparatus 10 has completed downloading the content on the ground of having received the notification, and causes the charge•settlement server 23 to perform charging and settling on the customer. The detailed description of the second operation has been completed.

Figure 16:
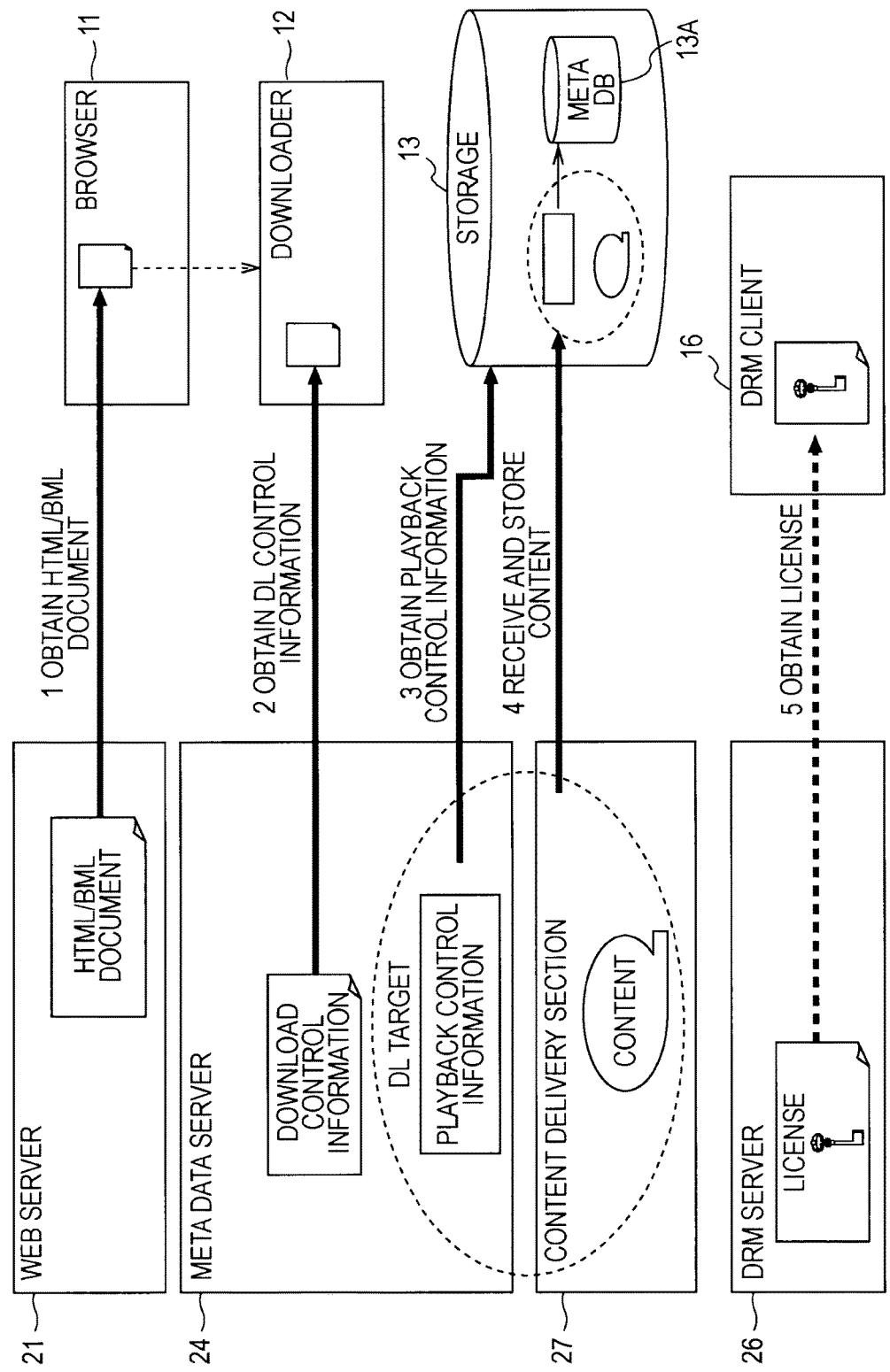
FIG. 16 is a diagram illustrating an overview of a third operation.

Next, FIG. 16 shows an overview of the third operation in which a downloadable content list 51 is displayed by the browser 11 on the basis of an HTML/BML document in the download navigation phase, and a broadcast-based content is downloaded in the download phase.

The browser 11 of the receiving apparatus 10 accesses the Web server 21 of the providing apparatus 20 in response to a predetermined operation by the user, and obtains the HTML/BML document 82. The browser 11 presents the downloadable content list 51 to the user as a Web page on the basis of the obtained HTML/BML document 82. When the user operates on downloadable content list 51 to select the content by the download unit, the downloader 12 is started.

The started downloader 12 obtains the download control information 83 corresponding to the download unit of the selected content from the meta server 24. In this regard, the URL of the meta server 24, which is the reference destination of the download control information obtained here is described in the HTML/BML document 82 obtained before.

The downloader 12 which has obtained the download control information 83 transfers the playback control information 84 from the meta server 24 in accordance with the contents described in the download control information 83, and stores the information into the storage 13.

Also, the downloader 12 receives a content broadcast by a television broadcasting signal on the basis of the broadcast-stream reference destination 111 and the broadcasting schedule 112 of the current download unit, which are described in the download control information 83 on the basis of the transferred playback control information 84, and stores the content into the storage 13.

Further, the downloader 12 generates a meta DB 13A for generating a local content list, and stores the list into the storage 13.

Further, the downloader 12 requests the DRM client 16 to obtain the license if the license acquisition destination 99 is described in the download control information 83. The DRM client 16 requests and obtains the license from the DRM server 26 in accordance with the contents described in the download control information 83 obtained by the downloader 12. Now, the description of the overview of the third operation has been completed.

Figure 17:
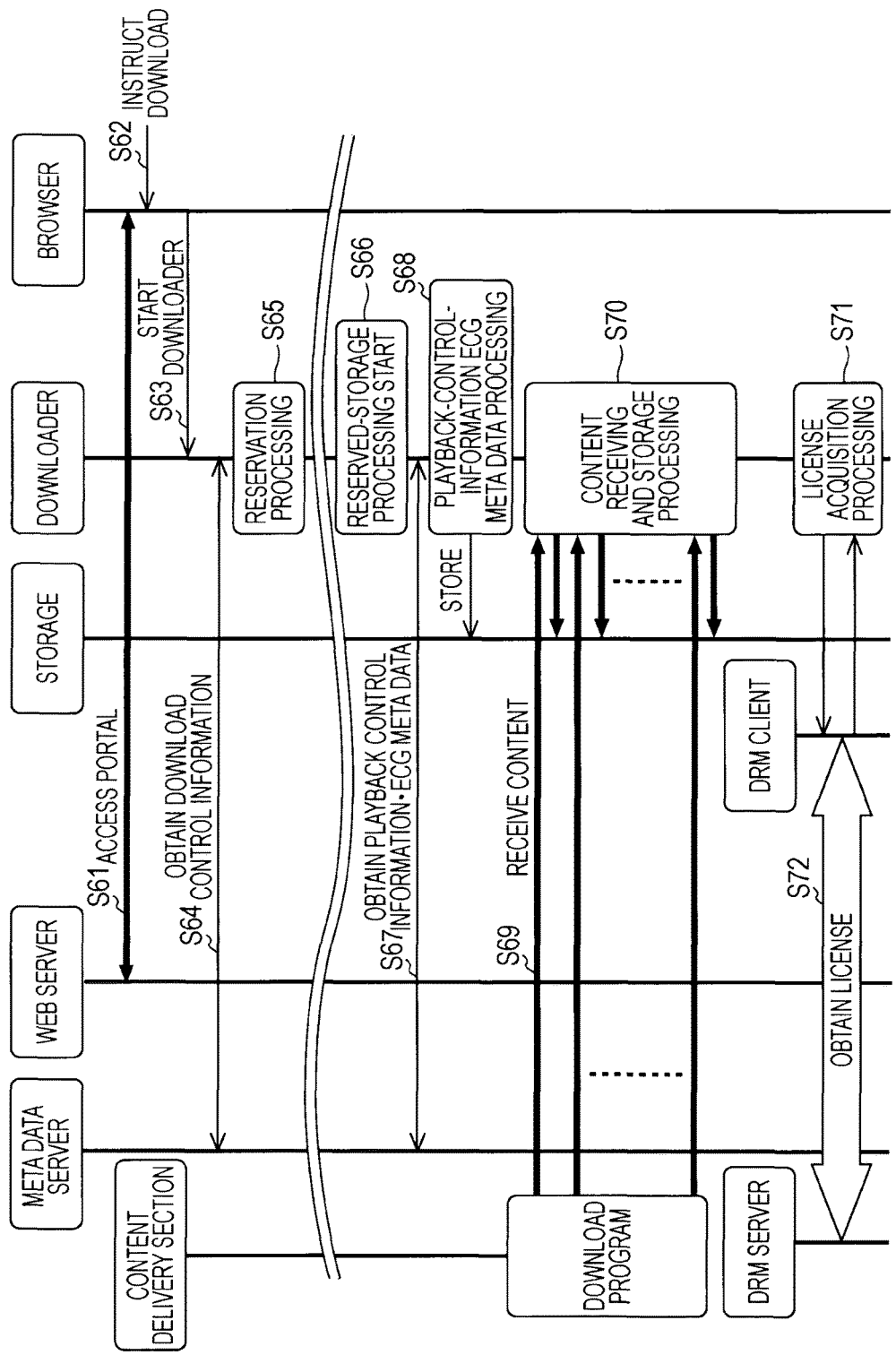
FIG. 17 is a timing chart illustrating the third operation.

Next, a detailed description will be given of the third operation with reference to a timing chart in FIG. 17.

The assumption of the third operation is the same as the above description of the overview. First, in step S61, the browser 11 of the receiving apparatus 10 accesses the Web server 21 of the providing apparatus 20, and performs authentication of a user. After that, the browser 11 obtains the HTML/BML document 82 for displaying a Web page. Further, the browser 11 presents the downloadable content list 51 to the user on the basis of the obtained HTML/BML document 82. In step S62, when the user selects a content and operates an instruction to perform downloading, the browser 11 starts the downloader 12, which is a help application, in step S63.

The started downloader 12 obtains the download control information 83 corresponding to the download unit including the selected content on the basis of the URL of the meta server 24 indicating the acquisition destination of the download control information 83 notified from the browser 11 in step S64, and stores the information into the storage 13.

In step S65, the downloader 12 performs initial processing in which the obtained download control information 83 is analyzed, download timing is checked, free space of the storage 13 is checked after getting a data size of the content to be downloaded, and a directory is created in the storage 13. Further, if a content to be downloaded is broadcast-based on the basis of the download control information 83, the downloader 12 performs content-receiving reservation processing in accordance with the broadcasting schedule.

After that, in step S66, an operation in accordance with the receiving reservation processing is restarted. That is to say, in step S67, the downloader 12 accesses the meta data server 24 on the basis of the reference destination of the playback control information described in each content information 100 of the download control information 83, and obtains individual playback control information 84 and ECG meta data 81 corresponding to all the contents included in the selected download unit. In step S68, the downloader 12 generates the meta DB 13A, and stores the DB into the storage 13 together with the playback control information 84.

In step S69, the content delivery section 27 of the providing apparatus 20 starts broadcasting of the content using a television broadcasting signal in accordance with a broadcasting schedule.

In step S70, the downloader 12 receives each content included in the download unit from a television broadcasting signal on the basis of the broadcast-stream reference destination 111 of the download control information 83 and each content acquisition destination described in each content information 100, and stores the received content into the storage 13.

Next, after the download of all the contents included in the download unit has been completed, the downloader 12 requests the DRM client 16 to obtain a license in step S71. In step S72, the DRM client 16 accesses the DRM server 26 on the basis of the license acquisition destination 99 described in the download control information 83, obtains the license after authentication processing including notification of a DRM-ID, holds the obtained license by the DRM client 16, and notifies the acquisition of the license to the downloader 12. In this regard, the license obtained here corresponds to the license acquisition destination 99 described in the download control information 83. The license may be a true license, or may be a dummy license.

In this regard, the DRM server 26 notifies the customer management server 22 that the DRM client 16 has made a request for license. The customer management server 22 confirms that the receiving apparatus 10 has completed downloading the content on the ground of having received the notification, and causes the charge•settlement server 23 to perform charging and settling on the customer. The detailed description of the third operation has been completed.

Figure 18:
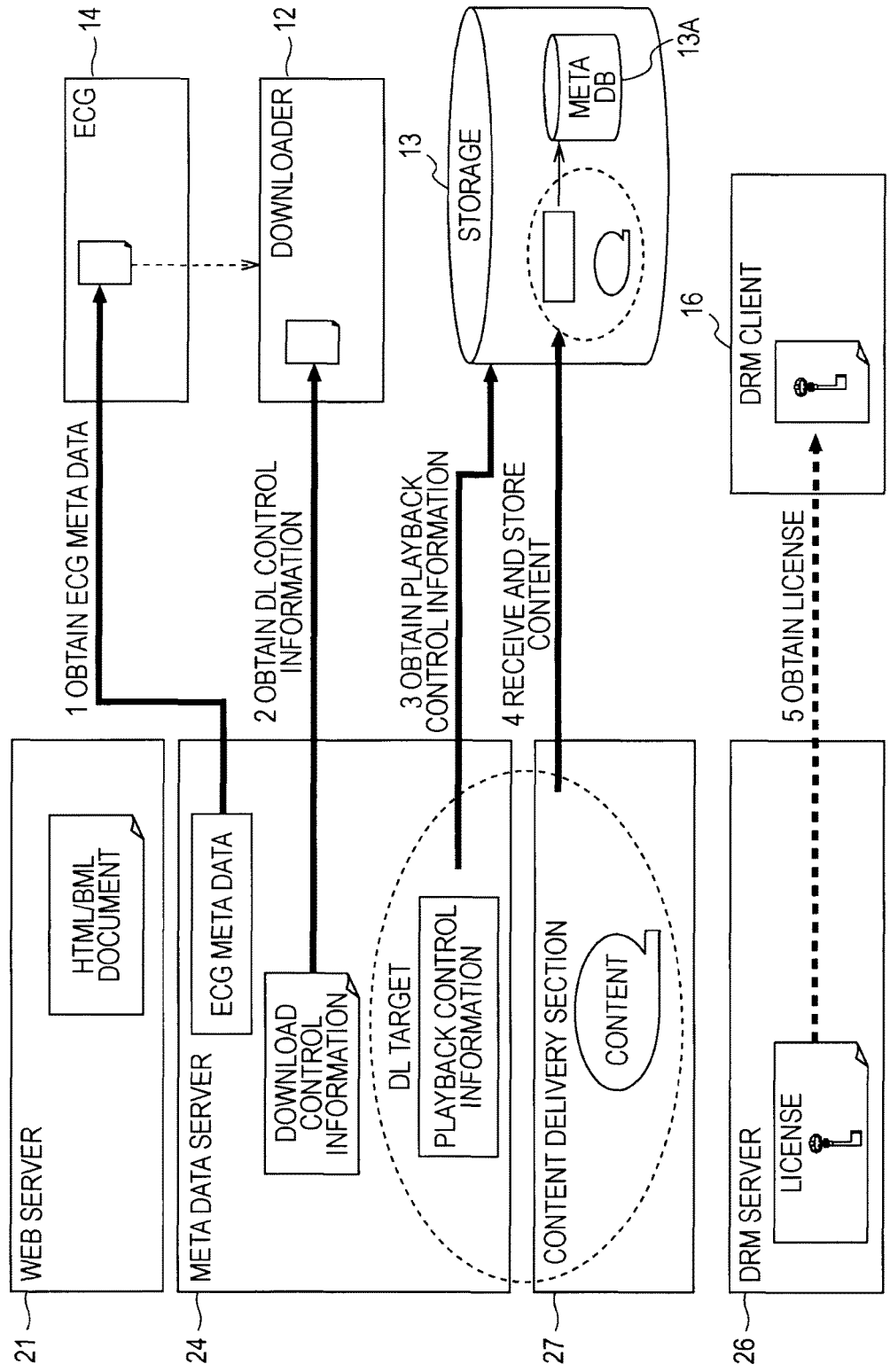
FIG. 18 is a diagram illustrating an overview of a fourth operation.

Next, FIG. 18 shows an overview of the fourth operation in which a downloadable content list 51 is displayed by the ECG 14 on the basis of ECG meta data 81 in the download navigation phase, and a broadcast-based content is downloaded in the download phase.

The ECG 14 of the receiving apparatus 10 accesses the meta data server 24 of the providing apparatus 20 periodically or in response to an instruction of the user, and obtains the ECG meta data 81. The ECG 14 presents the downloadable content list 51 to the user on the basis of the ECG meta data 81. When the user operates on the downloadable content list 51 to select the content by the download unit, the downloader 12 is started.

The started downloader 12 obtains the download control information 83 corresponding to the download unit of the selected content from the meta server 24. In this regard, the URL of the meta server 24, which is the reference destination of the download control information obtained here, is described in the instance meta data 81B included in the obtained ECG meta data 81.

The downloader 12, which has obtained the download control information 83, transfers the playback control information 84 from the meta server 24 in accordance with the contents described in the download control information 83, and stores the information into the storage 13.

Also, the downloader 12 receives a content broadcast by a television broadcasting signal on the basis of the broadcast-stream reference destination 111 and the broadcasting schedule 112 of the current download unit, which are described in the download control information 83, and stores the content into the storage 13.

Further, the downloader 12 generates a meta DB 13A for generating a local content list, and stores the list into the storage 13.

Further, the downloader 12 requests the DRM client 16 to obtain the license if the license acquisition destination 99 is described in the download control information 83. The DRM client 16 requests and obtains the license from the DRM server in accordance with the contents described in the download control information 83 obtained by the downloader 12. Now, the description of the overview of the fourth operation has been completed.

Figure 19:
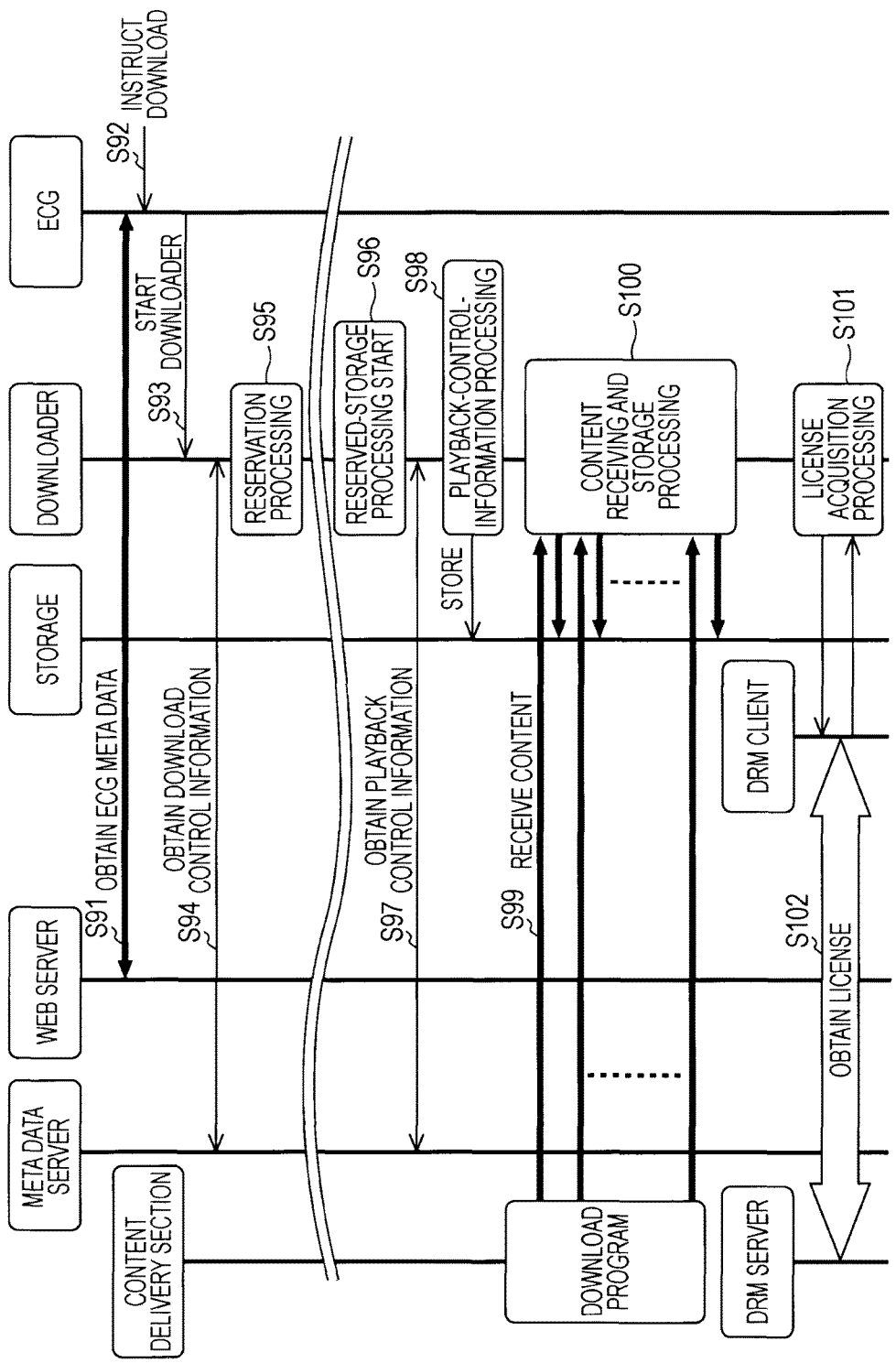
FIG. 19 is a timing chart illustrating the fourth operation.

Next, a detailed description will be given of the fourth operation with reference to a timing chart in FIG. 19.

The assumption of the fourth operation is the same as the above description of the overview. First, in step S91, the ECG 14 of the receiving apparatus 10 obtains the ECG meta data 81 of the downloadable contents from the meta data server 24 of the providing apparatus 20 periodically or in response to the user's operation. And the ECG 14 presents the downloadable content list 51 to the user on the basis of the obtained ECG meta data 81 in response to the instruction from the user. In step S92, when the user selects a content from the downloadable content list 51, which can be operated interactively, and operates an instruction to perform downloading, the ECG 14 starts the downloader 12, which is a help application, in step S93.

The started downloader 12 obtains, from the meta data server 24, the download control information 83 corresponding to the download unit including the selected content on the basis of the URL of the meta server 24 indicating the acquisition destination of the download control information 83 notified from the ECG 14 in step S94, and stores the information into the storage 13.

In step S95, the downloader 12 performs initial processing in which the obtained download control information 83 is analyzed, download timing is checked, free space of the storage 13 is checked after getting a data size of the content to be downloaded, and a directory is created in the storage 13. Further, if a content to be downloaded is broadcast-based, the downloader 12 performs content-receiving reservation processing in accordance with the broadcasting schedule on the basis of the download control information 83.

After that, in step S96, an operation in accordance with the receiving reservation processing is restarted. That is to say, in step S97, the downloader 12 accesses the meta data server 24 on the basis of the reference destination of the playback control information described in each content information 100 of the download control information 83, and obtains individual playback control information 84 and the ECG meta data 81 corresponding to all the contents included in the selected download unit. In step S98, the downloader 12 generates the meta DB 13A, and stores the DB together with the playback control information 84 into the storage 13.

In step S99, the content delivery section 27 of the providing apparatus 20 starts broadcasting of the content using a television broadcasting signal in accordance with a broadcasting schedule.

In step S100, the downloader 12 receives each content included in the download unit from a television broadcasting signal on the basis of the broadcast-stream reference destination 111 of the download control information 83 and each content acquisition destination described in each content information 100, and stores the received content into the storage 13.

Next, after the download of all the contents included in the download unit has completed, the downloader 12 requests the DRM client 16 to obtain a license in step S101. In step S102, the DRM client 16 accesses the DRM server 26 on the basis of the license acquisition destination 99 described in the download control information 83, obtains the license after authentication processing including notification of a DRM-ID, etc., holds the obtained license by the DRM client 16, and notifies the acquisition of the license to the downloader 12. In this regard, the license obtained here corresponds to the license acquisition destination 99 described in the download control information 83. The license may be a true license, or may be a dummy license.

In this regard, the DRM server 26 notifies the customer management server 22 that the DRM client 16 has made a request for license. The customer management server 22 confirms that the receiving apparatus 10 has completed downloading the content on the ground of having received the notification, and causes the charge•settlement server 23 to perform charging and settling on the customer. The detailed description has been completed of the fourth operation.

Figure 20:
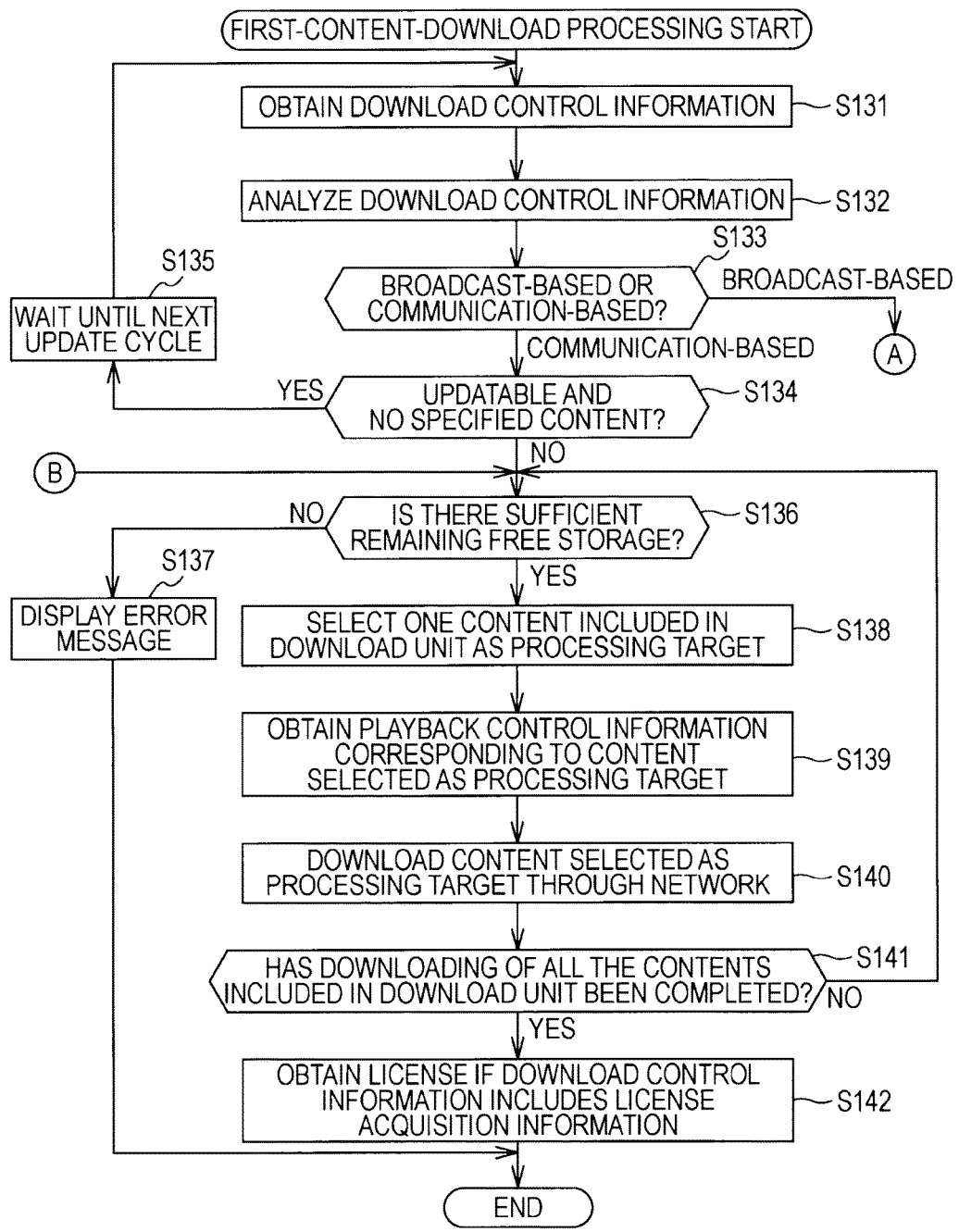
FIG. 20 is a flowchart illustrating first-content-download processing.

Next, a description will be given of first content download processing by the receiving apparatus 10 after the downloader 12 is started in particular when the above-described first to fourth operations are performed with reference to flowcharts shown in FIGS. 20 and 21.

The first content download processing is based on the assumption that the first format is used in the download control information 83, that is to say, the download control information 83 includes the broadcast-based•communication-based flag 94.

In step S131, the downloader 12 obtains the download control information 83 corresponding to the download unit including the selected content on the basis of the URL of the meta server 24 indicating the acquisition destination of the download control information 83 notified from the browser 11 or the ECG 14, and stores the information into the storage 13.

In step S132, the downloader 12 analyzes the obtained download control information 83 (for example, checking is performed on whether there is a broadcast-based•communication-based flag 94, an updatable•non-updatable flag 95, and content information 100, etc.).

In step S133, the downloader 12 determines whether a content to be downloaded is broadcast-based or communication-based in accordance with the analysis result of the download control information 83. Here, if determined to be broadcast-based, the processing proceeds to step S151 in FIG. 21 (described below). On the contrary, if determined to be communication-based, the processing proceeds to step S134.

In step S134, only if the downloader 12 has determined that the content is updatable and there is no content information 100 in the obtained download control information 83 in accordance with the analysis result of the download control information 83, the processing proceeds to step S135, or else, the processing proceeds to step S136.

In step S135, the downloader 12 waits for a period described in the assumed update cycle 98 of the obtained download control information 83, the processing returns to step S131, and the subsequent processing is restarted.

In step S136, the downloader 12 determines whether there is sufficient free space in the storage 13 after checking the data size 93 of the download unit of the obtained download control information 83. If it is determined that free space in the storage 13 is insufficient, the processing proceeds to step S137. In step S137, the downloader 12 displays, for example "Free space of the hard disk is insufficient", etc., presents an error message to the user, and the processing is terminated.

In step S136, if the amount of free space in the storage 13 is determined to be sufficient, the processing proceeds to step S138.

In step S138, the downloader 12 selects one content included in the download unit as a processing target. In step S139, the downloader 12 obtains the playback control information 84 and the ECG meta data 81 corresponding to the content to be processed. And the downloader 12 generates a meta DB 13A on the basis of the obtained ECG meta data 81, and stores the data into the storage 13 together with the playback control information 84.

In step S140, the downloader 12 downloads the content to be processed from the content server 25, and stores the content into the storage 13.

In step S140, the downloader 12 checks whether the download of all the contents included in the download unit has been completed. If there remains a content that has not been downloaded, the processing returns to step S136, and the subsequent processing is repeated. If determined that the download of all the contents included in the download unit has been completed, the processing proceeds to step S142.

In step S142, the downloader 12 requests the DRM client 16 to obtain the license only if a license acquisition destination 99 is described in the download control information 83. The DRM client 16 accesses the DRM server 26 on the basis of the license acquisition destination 99 described in the download control information 83, obtains the license after authentication processing including notification of a DRM-ID, etc., holds the obtained license by the DRM client 16, and notifies the acquisition of the license to the downloader 12. The download processing of a communication-based content is completed.

Figure 21:
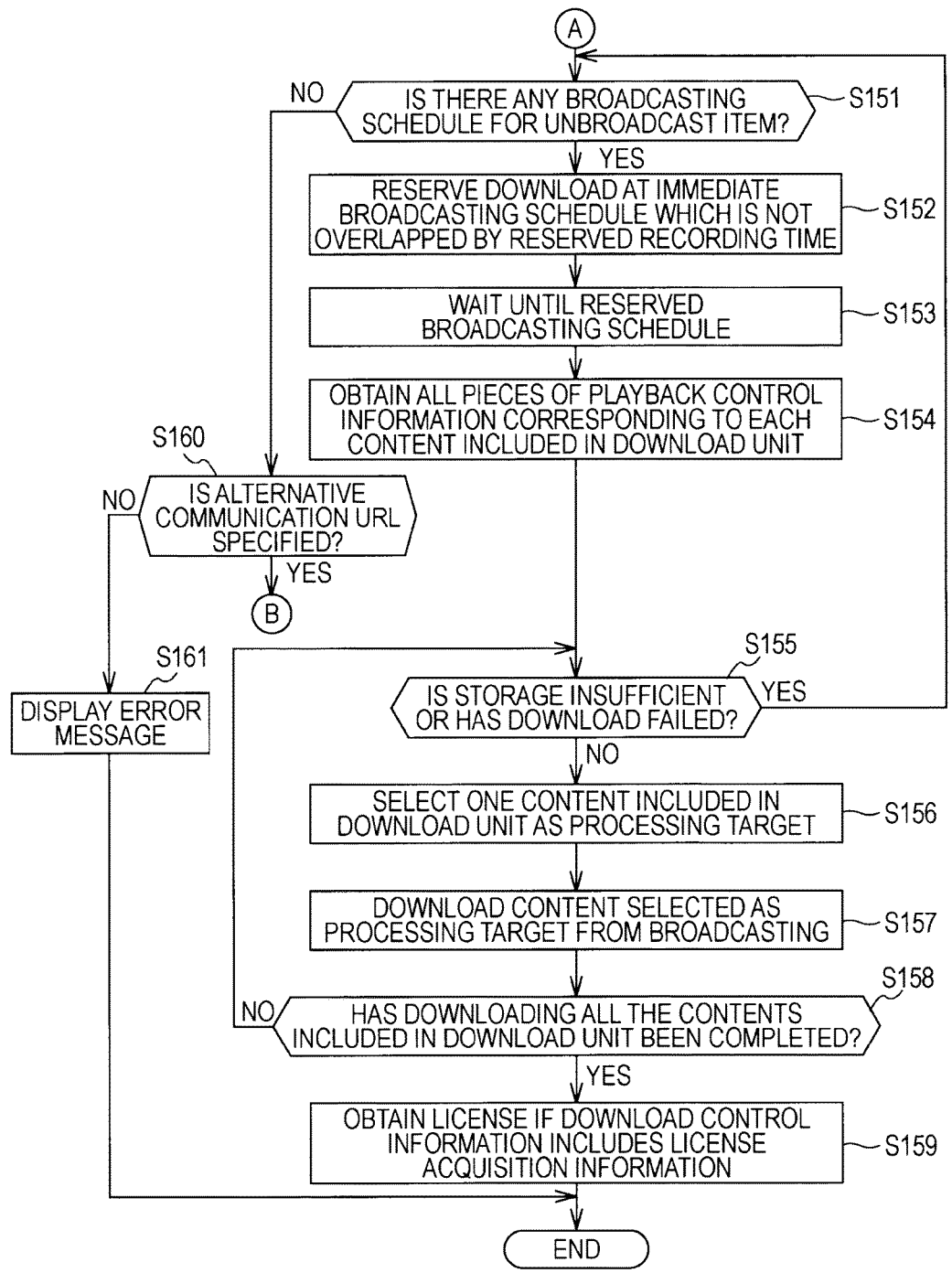
FIG. 21 is a flowchart illustrating first-content-download processing.

On the other hand, as described above, in step S133, if a content to be downloaded is determined to be broadcast-based, the processing proceeds to step S151 in FIG. 21.

In step S151, the downloader 12 refers to the broadcasting schedule 112 of the current download unit in the download control information 83, and determines whether there is a broadcasting schedule not yet completed (whether there is a content whose broadcasting schedule time has not come at that time). If determined that there is a broadcasting schedule not yet completed, the processing proceeds to step S152. In step S152, the downloader 12 reserves to perform downloading the content at most recent broadcasting schedule time which does not overlap the other recording reservations and download reservations among broadcasting schedules not yet completed.

In step S153, the downloader 12 waits until the reserved broadcasting schedule time has come. When that time has come, in step S154, the downloader 12 obtains individual playback control information 84 corresponding to all the contents included in the download unit from the meta data server 24 on the basis of each content information 100 of the download control information 83.

In step S155, the downloader 12 determines whether there is sufficient free space in the storage 13 after checking the data size 93 of the download unit of the download control information 83, and also determines whether downloading (receiving) the content has failed. If it is determined that free space in the storage 13 is sufficient and the downloading of the content has not failed, the processing proceeds to step S156.

In step S156, the downloader 12 selects one content included in the download unit as a processing target. In step S157, the downloader 12 receives and obtains a content included in a television broadcasting signal on the basis of the broadcast-stream reference destination 111 of the download control information 83 and content acquisition destination of individual content information 110, and stores the content into storage 13. Also, the downloader 12 obtains the ECG meta data 81 corresponding to the content to be processed from the meta data server 24. In this regard, if the television broadcasting signal includes the ECG meta data 81, the data may be received. And the downloader 12 generates meta DB 13A on the basis of the obtained ECG meta data 81, and stores the meta DB 13A into the storage 13 together with the playback control information 84.

In step S158, the downloader 12 checks whether the download of all the contents included in the download unit has been completed. If there is a content that has not been downloaded, the processing returns to step S155, and the subsequent processing is repeated. If determined that the download of all the contents included in the download unit have been completed, the processing proceeds to step S159.

In step S159, the downloader 12 requests the DRM client 16 to obtain the license only if a license acquisition destination 99 is described in the download control information 83. The DRM client 16 accesses the DRM server 26 on the basis of the license acquisition destination 99 described in the download control information 83, obtains the license after authentication processing including notification of a DRM-ID, etc., holds the obtained license by the DRM client 16, and notifies the acquisition of the license to the downloader 12. The download processing of a broadcast-based content is completed.

In this regard, in step S155, if it is determined that free space in the storage 13 is insufficient or the downloading (receiving) of the content has failed, the processing proceeds to step S151.

Also, in step S151, if it is determined that there is no broadcasting schedule of an item to be broadcast (items to be re-broadcast have all been broadcast), the processing proceeds to step S160.

In step S160, the downloader 12 determines whether an alternative-communication reference destination 114 is described in the download control information 83. If an alternative-communication reference destination 114 is described in the download control information 83, the processing proceeds to step S136 in FIG. 20, and a same communication-based content as the broadcast-based content to be received is downloaded.

On the other hand, in step S160, if an alternative-communication reference destination 114 is not described in the download control information 83, the processing proceeds to step S161. In step S161, the downloader 12 displays, for example "The download of the content has failed", etc., presents an error message to the user, and the processing is terminated.

The description of the first content download processing has been completed.

Next, a description will be given of second content download processing, which is different from the first content download processing. Before that, a description will be given of instance meta data 81B-2, an HTML/BML document 82-2, and the download control information 83.

Figure 22:
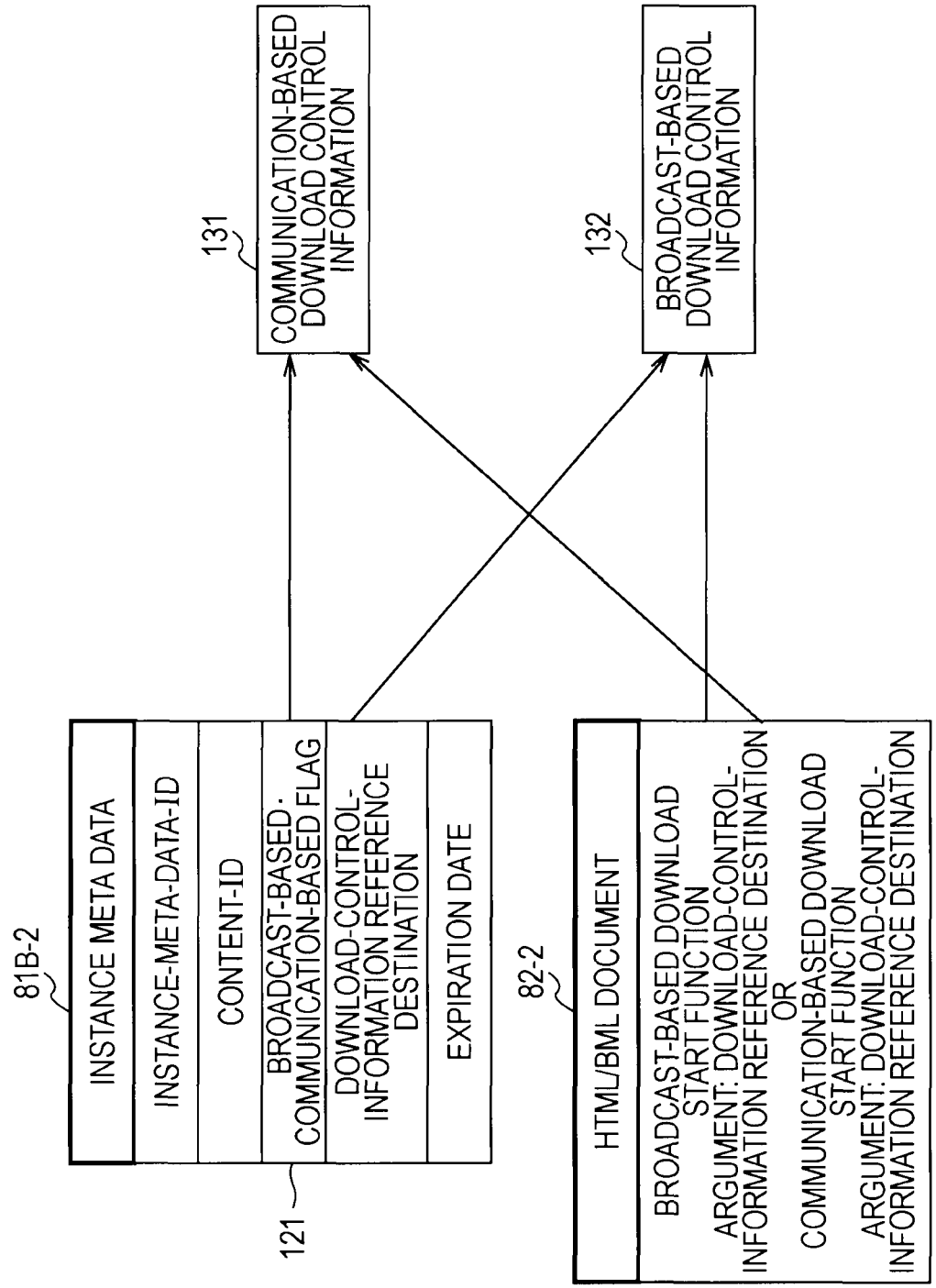
FIG. 22 is a diagram illustrating an example of a second structure of various kinds of data supplied from a providing apparatus to a receiving apparatus and a relationship therebetween.

FIG. 22 illustrates an example of structures of instance meta data 81B-2, and the HTML/BML document 82-2.

The instance meta data 81B-2 is produced by adding a broadcast-based•communication-based flag 121 to the instance meta data 81B-1 shown in FIG. 9. The broadcast-based•communication-based flag 121 is information indicating whether the corresponding to content is communication-based or broadcast-based. If the broadcast-based•communication-based flag 121 indicates communication-based, the download control information 83 (hereinafter, referred to as broadcast-based download control information 131) having a second format corresponding to only a communication-based content is obtained. On the other hand, if the broadcast-based•communication-based flag 121 indicates broadcast-based, the download control information 83 (hereinafter, referred to as broadcast-based download control information 132) having a third format corresponding to only a communication-based content is obtained.

The HTML/BML document 82-2 is obtained by the browser 11 from the Web server 21. The HTML/BML document 82-2 includes a communication-based download start function or a broadcast-based download start function for starting the downloader 12 and a reference destination (specific information of the download control information and the acquisition destination thereof) of the download control information necessary for downloading a content selected by the user as an argument.

Accordingly, in the second content download processing, in a phase in which the instance meta data 81B-2 or the HTML/BML document 82-2 is obtained and analyzed, a determination is made on whether the corresponding content is broadcast-based or communication-based.

Figure 23:
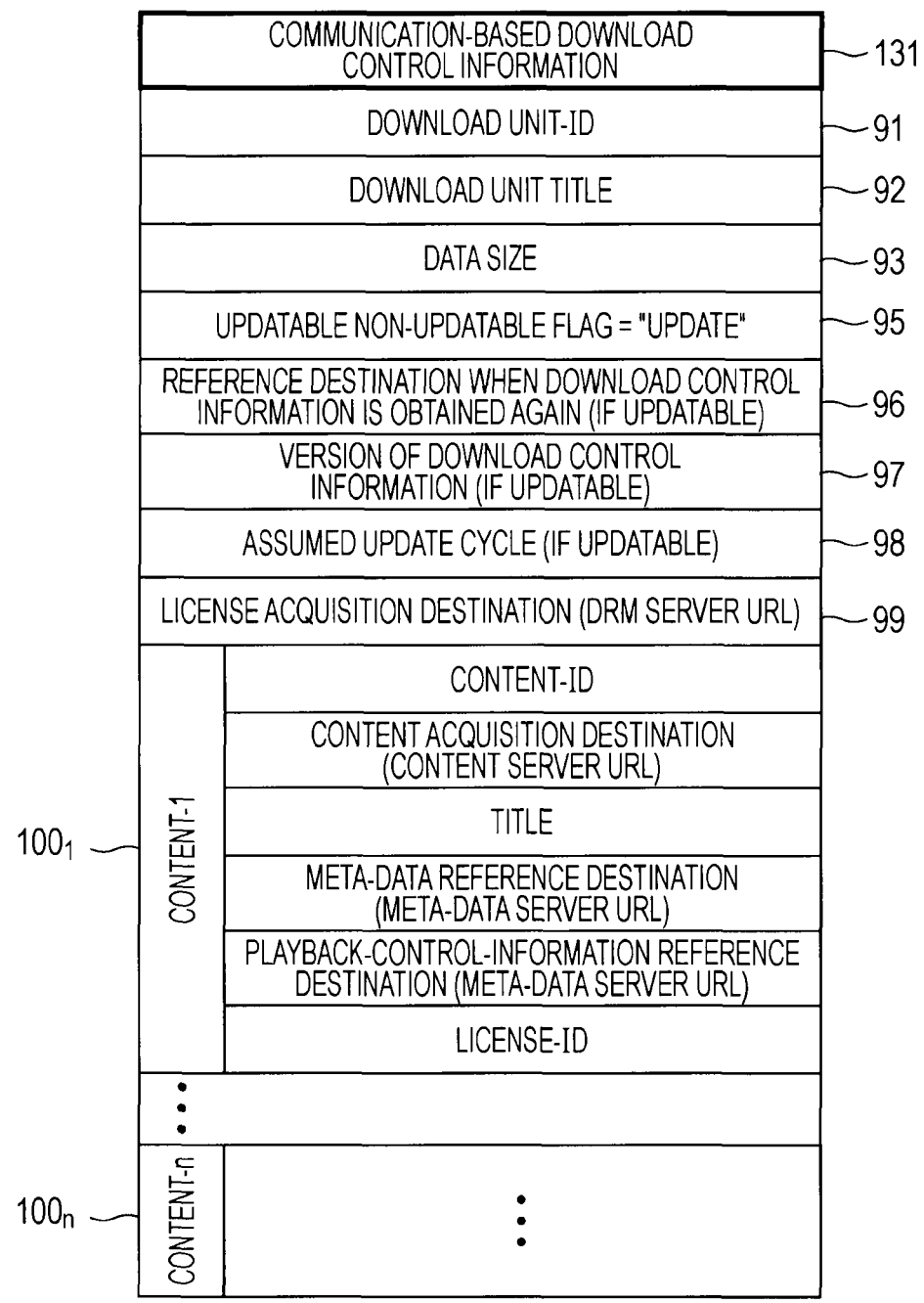
FIG. 23 is a diagram illustrating an example of communication-based download control information.

FIG. 23 shows an example of a structure of the second format of the download control information, that is to say, the communication-based download information 131.

The communication-based download information 131 is produced by deleting the broadcast-based•communication-based flag 94 and the broadcast-based information 100 from the first format of the download control information 83 shown in FIG. 10 or 11, and includes the other items in the same manner as the first format.

Figure 24:
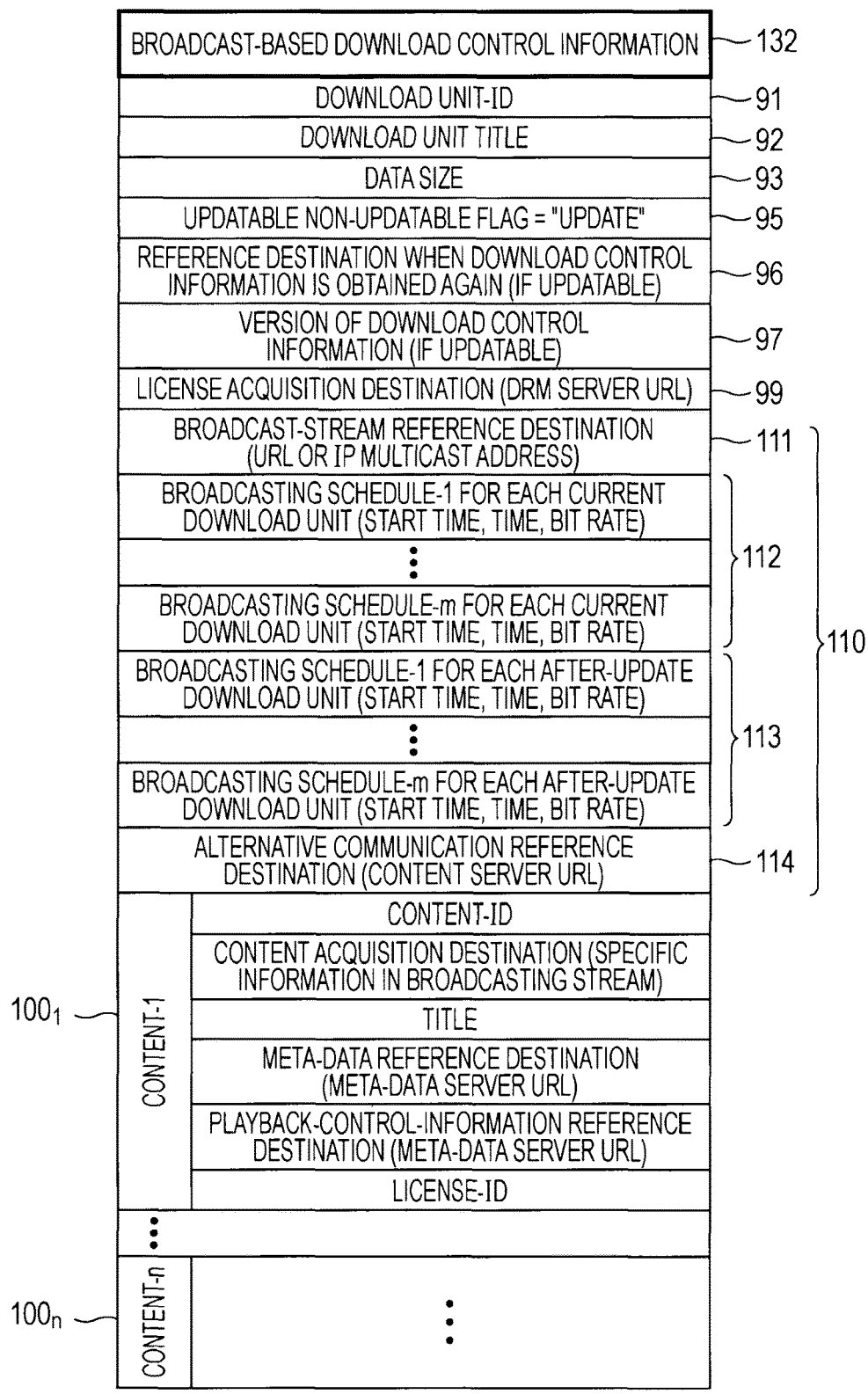
FIG. 24 is a diagram illustrating an example of broadcast-based download control information.

FIG. 24 shows an example of a structure of the third format of the download control information, that is to say, the broadcast-based download information 132.

The broadcast-based download information 132 is produced by deleting the broadcast-based•communication-based flag 94 and the broadcast-based information 100 from the first format of the download control information 83 shown in FIG. 10 or 11, and includes the other items in the same manner as the first format.

Figure 25:
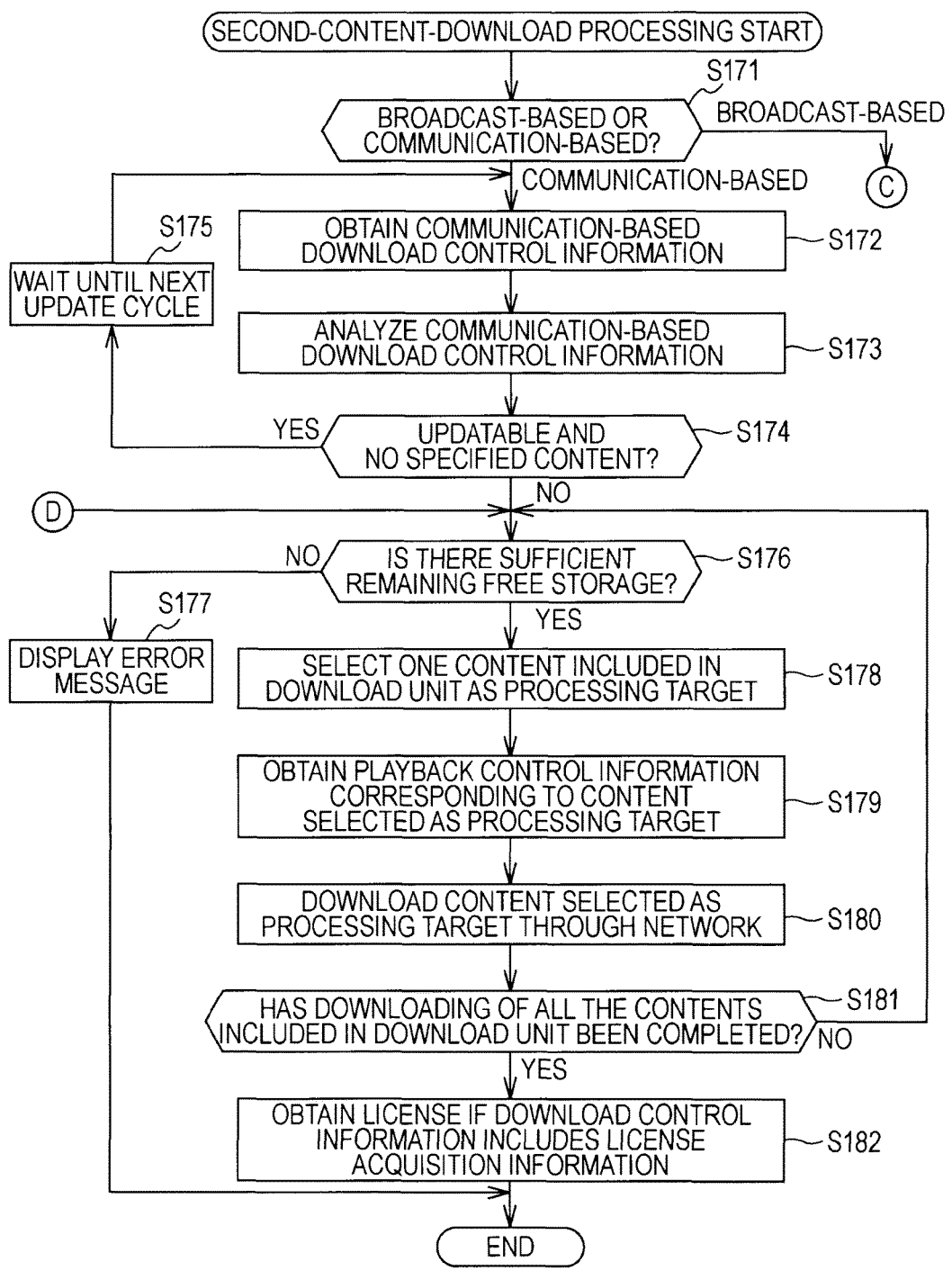
FIG. 25 is a flowchart illustrating second-content-download processing.

Next, a description will be given of second content download processing by the receiving apparatus 10 mainly after the downloader 12 is started when the above-described first to fourth operations are performed with reference to flowcharts shown in FIGS. 25 and 26.

The second content download processing is based on the assumption that the second or the third format is used in the download control information 83, that is to say, the download control information 83 does not include the broadcast-based•communication-based flag 94.

First, in step S171, a determination is made of whether a content to be downloaded is broadcast-based or communication-based. This determination is made before the downloader 12 is started either on the basis of the HTML/BML document 82-2 by the browser 11 or on the basis of the instance meta data 81B-2 by the ECG. After the determination, the downloader 12 is started.

In step S171, if determined to be broadcast-based, the processing proceeds to step S191 in FIG. 26 (described below). On the contrary, if determined to be communication-based, the processing proceeds to step S172.

In step S172, the downloader 12 obtains the communication-based download control information 131 corresponding to the download unit including the selected content on the basis of the URL of the meta server 24 indicating the acquisition destination of the communication-based download control information 131 notified from the browser 11 or the ECG 14, and stores the information into the storage 13.

In step S173, the downloader 12 analyzes the obtained communication-based download control information 131 (specifically, for example, checking is performed on whether there is an updatable•non-updatable flag 95, and content information 100).

In step S174, only if the downloader 12 has determined that the content is updatable and there is no content information 100 in the communication-based download control information 131 in accordance with the analysis result of the communication-based download control information 131, the processing proceeds to step S175, or else, the processing proceeds to step S176.

In step S175, the downloader 12 waits for a period described in the assumed update cycle 98 of the obtained communication-based download control information 131, then the processing returns to step S172, and the subsequent processing is restarted.

In step S176, the downloader 12 determines whether there is sufficient free space in the storage 13 after checking the data size 93 of the download unit of the obtained communication-based download control information 131. If it is determined that free space in the storage 13 is insufficient, the processing proceeds to step S177. In step S177, the downloader 12 displays, for example "Free space of the hard disk is insufficient", etc., presents an error message to the user, and the processing is terminated.

In step S176, if the amount of free space in the storage 13 is determined to be sufficient, the processing proceeds to step S178.

In step S178, the downloader 12 selects one content included in the download unit as a processing target. In step S179, the downloader 12 obtains the playback control information 84 and the ECG meta data 81 corresponding to the content to be processed. And the downloader 12 generates a meta DB 13A on the basis of the obtained ECG meta data 81, and stores the data into the storage 13 together with the playback control information 84.

In step S181, the downloader 12 downloads the content to be processed from the content server 25, and stores the content into the storage 13.

In step S181, the downloader 12 checks whether the download of all the contents included in the download unit has been completed. If there remains a content that has not been downloaded, the processing returns to step S176, and the subsequent processing is repeated. If determined that the download of all the contents included in the download unit has been completed, the processing proceeds to step S182.

In step S182, the downloader 12 requests the DRM client 16 to obtain the license only if a license acquisition destination 99 is described in the communication-based download information 131. The DRM client 16 accesses the DRM server 26 on the basis of the license acquisition destination 99 described in the download control information 83, obtains the license after authentication processing including notification of a DRM-ID, etc., holds the obtained license by the DRM client 16, and notifies the acquisition of the license to the downloader 12. The download processing of a communication-based content is completed.

Figure 26:
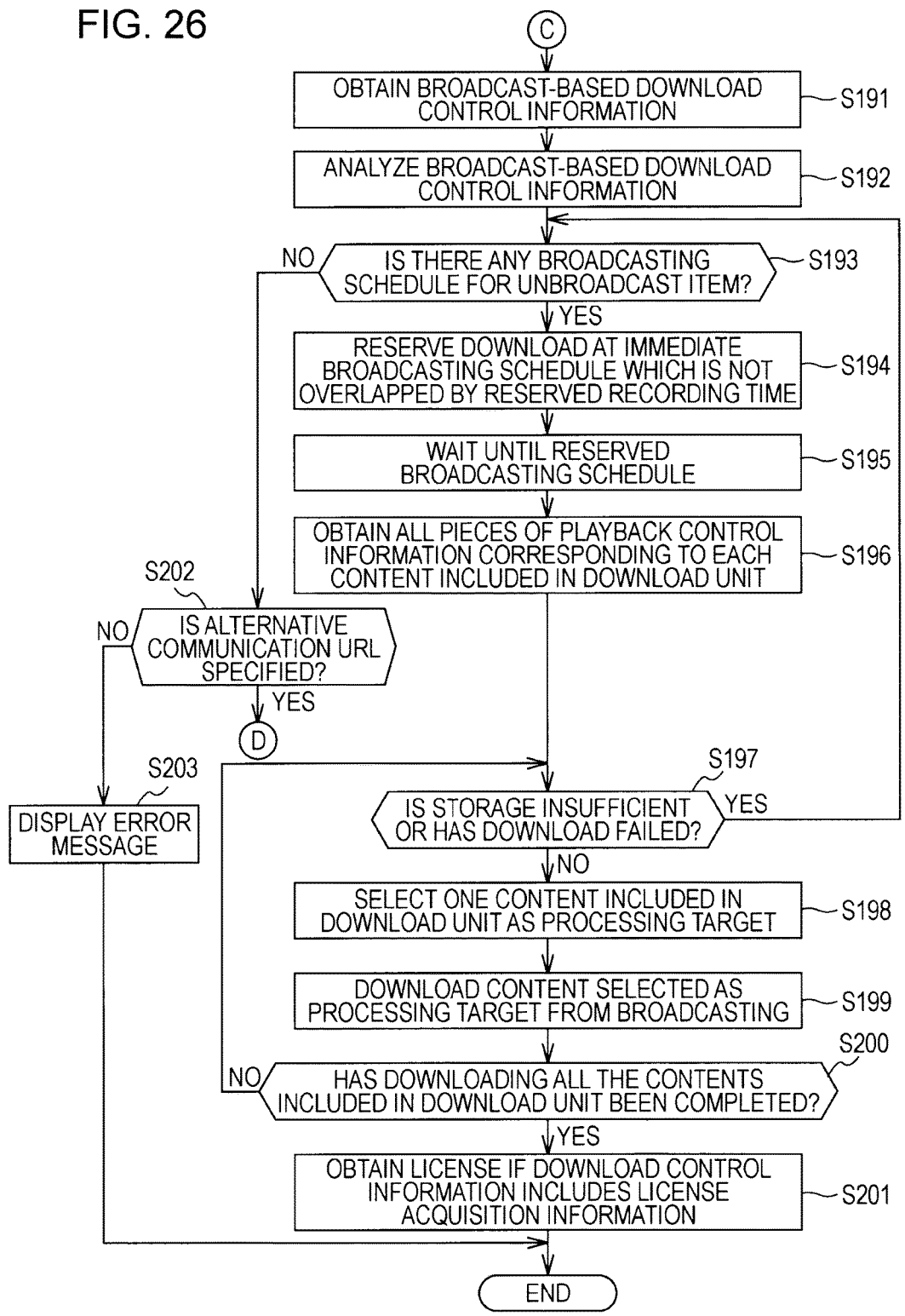
FIG. 26 is a flowchart illustrating second-content-download processing.

On the other hand, as described above, in step S171, if a content to be downloaded is broadcast-based, the processing proceeds to step S191 in FIG. 26.

In step S191, the downloader 12 obtains the broadcast-based download information 132 corresponding to the download unit including the selected content on the basis of the URL of the meta server 24 indicating the acquisition destination of the broadcast-based download information 132 notified from the browser 11 or the ECG 14, and stores the information into the storage 13.

In step S192, the downloader 12 analyzes the obtained broadcast-based download information 132 (specifically, for example, checking is performed on whether there is an updatable·non-updatable flag 95, and content information 100).

In step S193, the downloader 12 refers to the broadcasting schedule 112 of the current download unit in the broadcast-based download information 132, and determines whether there is a broadcasting schedule not yet completed (whether there is a content whose broadcasting schedule time has not come at that time). If determined that there is a broadcasting schedule not yet completed, the processing proceeds to step S194. In step S194, the downloader 12 reserves to perform downloading the content at most recent broadcasting schedule time which does not overlap the other recording reservations and download reservations among broadcasting schedules not yet completed.

In step S195, the downloader 12 waits until the reserved broadcasting schedule time has come. When that time has come, in step S196, the downloader 12 obtains the individual playback control information 84 corresponding to all the contents included in the download unit from the meta data server 24 on the basis of each content information 100 of the broadcast-based download information 132.

In step S197, the downloader 12 determines whether there is sufficient free space in the storage 13 after checking the data size 93 of the download unit of the broadcast-based download information 132, and also determines whether downloading (receiving) the content has failed. If it is determined that free space in the storage 13 is sufficient and the downloading of the content has not failed, the processing proceeds to step S198.

In step S198, the downloader 12 selects one content included in the download unit as a processing target. In step S199, the downloader 12 receives and obtains a content included in a television broadcasting signal on the basis of the broadcast-stream reference destination 111 of the broadcast-based download information 132 and content acquisition destination of individual content information 100, and stores the content into storage 13. Also, the downloader 12 obtains the ECG meta data 81 corresponding to the content to be processed from the meta data server 24. In this regard, if the television broadcasting signal includes the ECG meta data 81, the data may be received. And the downloader 12 generates meta DB 13A on the basis of the obtained ECG meta data 81, and stores the meta DB 13A into the storage 13 together with the playback control information 84.

In step S200, the downloader 12 checks whether the download of all the contents included in the download unit has been completed. If there is a content that has not been downloaded, the processing returns to step S197, and the subsequent processing is repeated. If determined that the download of all the contents included in the download unit have been completed, the processing proceeds to step S201.

In step S201, the downloader 12 requests the DRM client 16 to obtain the license only if a license acquisition destination 99 is described in the download control information 83. The DRM client 16 accesses the DRM server 26 on the basis of the license acquisition destination 99 described in the broadcast-based download information 132, obtains the license after authentication processing including notification of a DRM-ID, etc., holds the obtained license by the DRM client 16, and notifies the acquisition of the license to the downloader 12. The download processing of a broadcast-based content is completed.

In this regard, in step S197, if it is determined that free space in the storage 13 is insufficient or the downloading (receiving) of the content has failed, the processing proceeds to step S193.

Also, in step S193, if it is determined that there is no broadcasting schedule of an item to be broadcast (items to be rebroadcast have all been broadcast), the processing proceeds to step S202.

In step S202, the downloader 12 determines whether an alternative-communication reference destination 114 is described in the broadcast-based download information 132. If an alternative-communication reference destination 114 is described in the download control information 83, the processing proceeds to step S176 in FIG. 25, and a same communication-based content as the broadcast-based content to be received is downloaded.

On the other hand, step S202, if an alternative-communication reference destination 114 is not described in the broadcast-based download information 132, the processing proceeds to step S203. In step S203, the downloader 12 displays, for example "The download of the content has failed", etc., presents an error message to the user, and the processing is terminated.

The description of the second content download processing has been completed.

Figure 27:
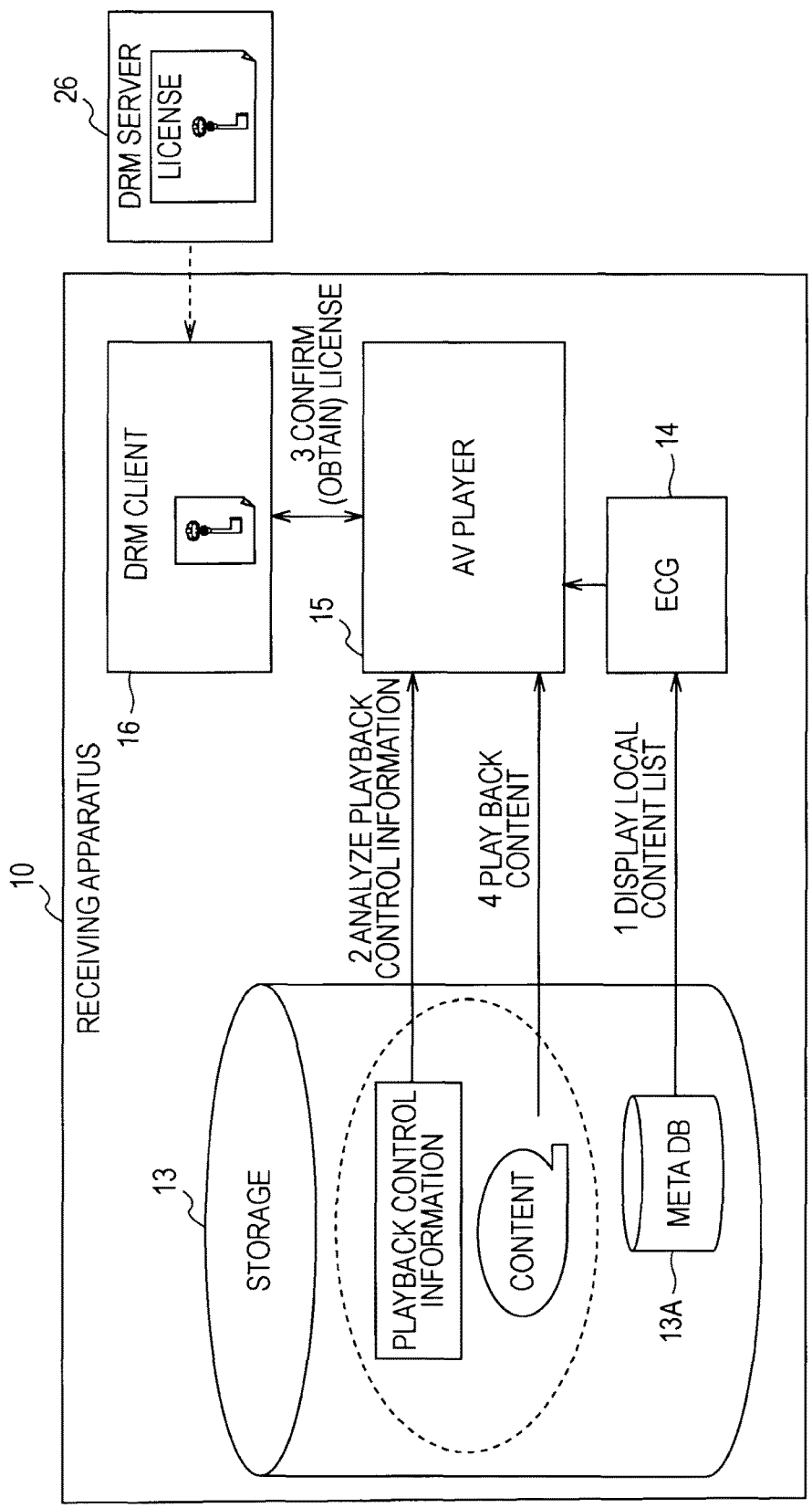
FIG. 27 is a diagram illustrating an overview of playback processing of a local content.

Next, a description will be given of an overview of the operation for playing back a downloaded content in the receiving apparatus 10 with reference to FIG. 27.

The ECG 14 generates a local content list 61 on the basis of the meta DB 13A held in the storage 13, and presents the list to the user. When the user selects a content in the presented local content list 61, and instructs to view the content, the ECG 14 starts the AV player 15, and the ECG 14 notifies information indicating the playback-instructed content to the started AV player 15.

The AV player 15 reads and analyzes the playback control information 84 corresponding to the content in response to this notification, extracts a license-ID of the license corresponding to the content, and checks whether the license (true license) corresponding to the license-ID has already been held by the DRM client 16.

Here, if the license (true license) corresponding to the license-ID is not held by the DRM client 16, that is to say, if the license held by the DRM client 16 is a dummy license, after user's acceptance of charge, etc., the DRM client 16 accesses the DRM server 26 on the basis of the license acquisition destination (the URL of the DRM server 26) described in the playback control information 84, obtains the license (true license) of the license-ID described in the playback control information 84, and supplies the content key included therein to the AV player 15.

After that, the AV player 15 reads the content from the storage 13, decrypts the content using the content key supplied from the DRM client 16, obtains AV data by decoding the coded data obtained as a result, and displays the corresponding video and outputs the sound.

In this regard, it is possible to impose restrictions of a use period and a number of playback times on a true license. If a restriction is imposed on a number of playback times, the user is notified that the remaining number of times allowed for playback is decreased each time playback processing is performed. Also, when the remaining number of times allowed for playback becomes zero, after getting the user's permission, a new license is supplied by charging again. The description has been given of an overview of the operation at playback time.

Figure 28:
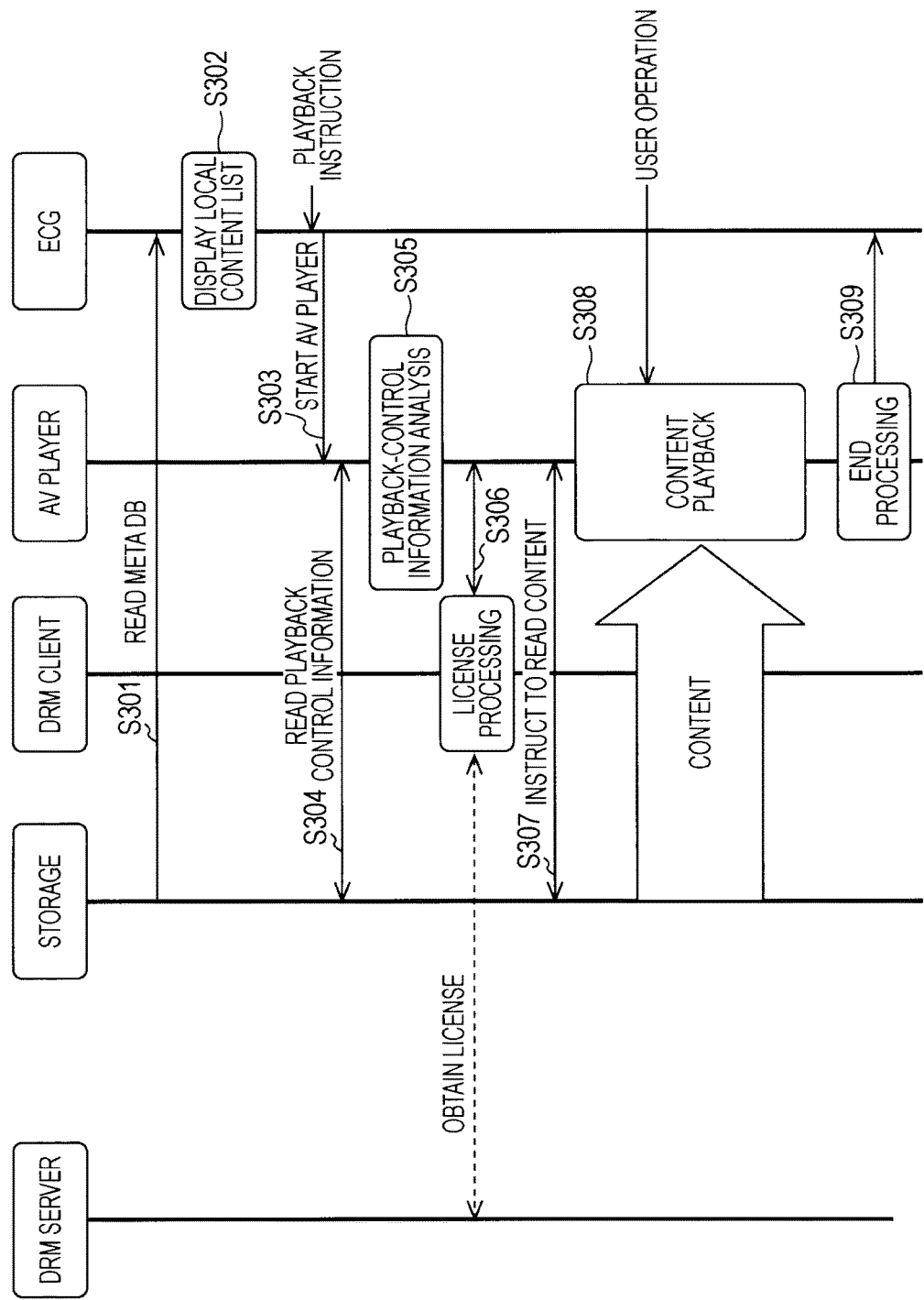
FIG. 28 is a timing chart illustrating the playback processing of a local content.
Figure 29:
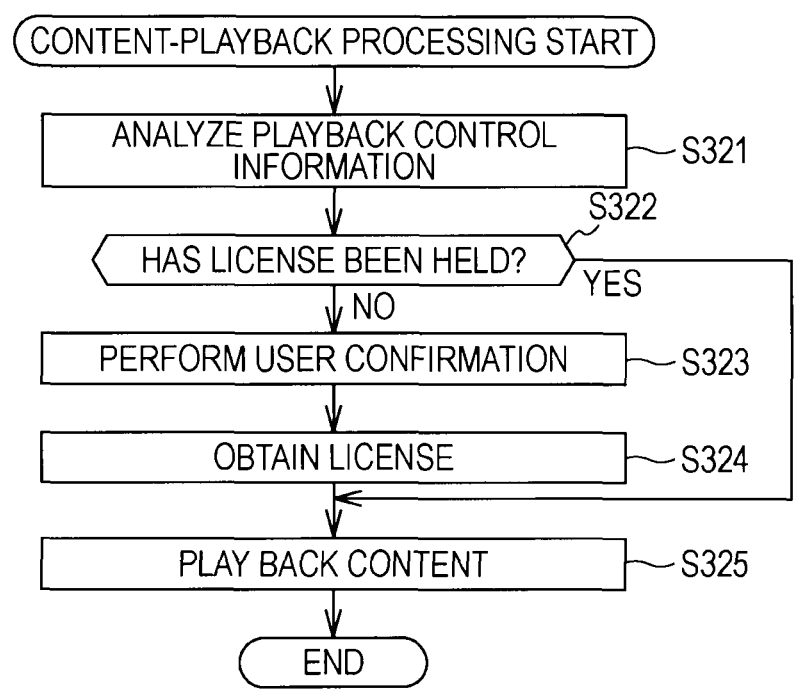
FIG. 29 is a flowchart illustrating the playback processing of a local content.

Next, a detailed description will be given of an operation at playback time with reference to a timing chart in FIG. 28 and a flowchart in FIG. 29. In this regard, FIG. 29 is a figure in which attention is particularly focused on processing by the AV player 15 of the receiving apparatus 10 among the playback processing.

In step S301, the ECG 14 reads the meta DB 13A from the storage 13 in response to a predetermined operation by the user, and in step S302, the ECG 14 generates a local content list 61, which is an interactive user interface on the basis of the read meta DB 13A, and presents the list to the user.

If the user selects a content, and instructs to view the content on the local content list 61, in step S303, the ECG 14 starts the AV player 15, and notifies information indicating a content whose playback is instructed to the started AV player 15.

In step S304, the AV player 15 reads the playback control information 84 corresponding to the content from the storage 13. In step S305, the AV player 15 analyzes the playback control information 84, and extracts a license-ID of the license corresponding to the content (corresponds to step S321 in FIG. 29).

Further, in step S306, the AV player 15 checks whether the license (true license) corresponding to the license-ID is already held by the DRM client 16 (corresponds to step S322 in FIG. 29). Here, if the license corresponding to the license-ID is not held by the DRM client 16, that is to say, if the license held by the DRM client 16 is a dummy license, the DRM client 16 accesses the DRM server 26 on the basis of the license acquisition destination described in the playback control information 84, obtains of the license (true license) of the license-ID described in the playback control information 84, then after determining that the use condition included therein is satisfied, and then supplies the content key included therein to the AV player 15 (corresponds to step S324 in FIG. 29).

In this regard, before obtaining a true license, the AV player 15 may check agreement of the user on the charge and settlement, for example "Are you going to view? If OK button is pressed, you will be charged", or the like (corresponds to step S323 in FIG. 29).

In step S307, the AV player 15 which has obtained the content key instructs to read the content from the storage 13. In step S308, the AV player 15 plays back the content supplied from the storage 13 in response to this instruction (decrypts the encrypted content, and obtains AV data by decoding the coded data obtained as a result)(corresponds to step S325 in FIG. 29).

In this regard, at the time of playing back the content, the AV player 15 is subject to control of the user, and it becomes possible for the user to perform various operations (trick play operations, such as fast-forward playback, fast-reverse playback, cueing playback, etc.).

After the playback of the content has been completed, in step S309, the AV player 15 deletes the content key by itself, and performs end processing including return processing from the user's control to the control of the ECG 14.

The description of the operation at the time of playing back a downloaded content has been completed.

As described above, in a content downloading system 1 to which the present invention is applied, a service providing side can provide a content of either communication based or broadcast based to a receiving apparatus 10. The receiving apparatus 10 can play back the content without distinguishing a communication-based content and a broadcast-based content.

Accordingly, for example, if a content is very popular, and a large number of downloads of the content are expected, it becomes possible to perform an operation of providing the content as broadcast based. On the contrary, if a content is very specialized and is directed for a niche market in which many downloads is not expected, it becomes possible to perform an operation of providing the content as communication based.

Also, for example, it is possible to perform operation such that at first, a content is broadcast as a broadcast-based content, and then after a predetermined period of time has passed, the content is supplied as a communication-based content. Thus, even if downloading of a broadcast-based content has failed, it is possible to compensate the content by the communication-based content.

In this regard, in the above-described embodiment, the download control information 83 and the playback control information 84 are supplied to the downloader 12 of the receiving apparatus 10 from the meta server 24 of the providing apparatus 20 through the Internet 2. However, either the download control information 83 or the playback control information 84 may be broadcast using a broadcasting signal in order to be supplied to the receiving apparatus 10.

The present invention is not limited to a video content, and can be applied to download services of various kinds of product content, such as music, computer programs, etc.

The above-described series of processing can be executed by hardware or by software. When the series of processing is executed by software, programs constituting the software may be installed in a computer built in a dedicated hardware. Alternatively, the programs may be installed from a program recording medium, for example in a general-purpose personal computer, etc., capable of executing various functions by installing various programs.

FIG. 30 is a block diagram illustrating an example of a hardware configuration of a computer which executes the above-described series of processing by programs.

In the computer 200, a CPU (Central Processing Unit) 201, a ROM (Read Only Memory) 202, a RAM (Random Access Memory) 203 are mutually connected through a bus 204.

An input/output interface 205 is also connected to the bus 204. An input section 206 including a keyboard, a mouse, a microphone, etc., an output section 207 including a display, a speaker, etc., a storage section 208 including a hard disk, a nonvolatile memory, etc., a communication section 209 including a network interface, etc., and a drive 210 for driving a removable medium 211, such as a magnetic disk, an optical disc, a magneto-optical disc, or a semiconductor memory, etc., are connected to the input/output interface 205.

In the computer 200 having the configuration as described above, the CPU 201 loads the program stored, for example in storage section 208 to the RAM 203 through the input/output interface 205 and the bus 204 to execute the program, thereby the above-described series of processing is performed.

In this regard, the programs executed by the computer 200 may be programs that are processed in time series in accordance with the described sequence in this specification. Alternatively, the programs may be the programs to be executed in parallel or at necessary timing, such as at the time of being called, or the like.

Also, the programs may be performed on a single computer, or may be distributedly performed on a plurality of computers. Moreover, the programs may be transferred to a remote computer to be performed.

Also, in this specification, a system represents the overall apparatus including a plurality of apparatuses.

The present application contains subject matter related to that disclosed in Japanese Priority Patent Applications JP 2008-155455 and 2009-092675 filed in the Japan Patent Office on Jun. 13, 2008 and Apr. 7, 2009, respectively, the entire content of which is hereby incorporated by reference.

In this regard, an embodiment of the present invention is not limited to the above-described embodiments. It is possible to make various changes without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A content providing apparatus for providing a content to a content receiving apparatus, the content providing apparatus comprising:
content-information providing circuitry that provides downloadable content information to the content receiving apparatus, the content receiving apparatus outputs a user interface for selection of the content from at least one content that is identified in the downloadable content information as available for download by the content receiving apparatus;
control-information providing circuitry, associated with first URL information included in the downloadable content information, that provides download control information to the content receiving apparatus in response to a first request from the content receiving apparatus, the download control information being associated with the content of the at least one content selected by a user via the user interface, the first request being sent by the content receiving apparatus in response to the selection of the content to be downloaded by the user via the user interface, the download control information indicating whether the selected content is broadcast based or communication based content;
a transmitter that delivers the selected content using an RF broadcasting signal in accordance with broadcast schedule information and broadcast stream information included in the download control information when the selected content is broadcast based content; and
a content server that starts providing the selected content through the Internet in response to a second request from the content receiving apparatus based on second URL information included in the download control information when the selected content is communication based, wherein
when the download control information indicates the selected content is broadcast based and the content receiving apparatus fails to download the selected content delivered using the RF broadcasting signal, the content receiving apparatus downloads the selected content provided through the Internet to compensate for the failed download of the selected content delivered using the RF broadcasting signal.

2. The content providing apparatus according to claim 1, wherein the content information includes information indicating whether the at least one content is the broadcast-based content or the communication-based content.

3. The content providing apparatus according to claim 1, wherein the broadcast schedule information indicates a broadcasting schedule of the selected content.

4. The content providing apparatus according to claim 1, wherein the broadcast stream information includes a URL (Uniform Resource Locator) or an IP (Internet Protocol) multicast address in order to identify a broadcast stream delivering the content.

5. The content providing apparatus according to claim 1, wherein the download control information is associated with the broadcast-based content and further includes alternative communication information indicating the content server provides the same communication-based content as the broadcast-based content.

6. The content providing apparatus according to claim 1, wherein the download control information is associated with the broadcast-based content and is an updatable content that further includes information indicating a broadcasting schedule of an after-update content.

7. The content providing apparatus according to claim 1, wherein the control-information providing circuitry also provides playback control information necessary for the content receiving apparatus to play back the selected content in response to a third request from the content receiving apparatus based on the download control information.

8. The content providing apparatus according to claim 7, further comprising:

license providing circuitry that provides through the Internet a license including a key for decrypting the selected content in response to a fourth request from the content receiving apparatus based on either the download control information or the playback control information.

9. The content providing apparatus according to claim 1, wherein the download control information further includes information indicating whether the selected content is updatable or non-updatable.

10. A method of providing a content in a content providing apparatus for providing the content to a content receiving apparatus, the method comprising:

providing, by first circuitry of the content providing apparatus, downloadable content information to the content receiving apparatus, the content receiving apparatus outputs a user interface for selection of the content from at least one content that is identified in the downloadable content information as available for download by the content receiving apparatus;

providing, by second circuitry of the content providing apparatus and associated with first URL information included in the downloadable content information, download control information to the content receiving apparatus in response to a first request from the content receiving apparatus, the download control information being associated with the content of the at least one content selected by a user via the user interface, the first request being sent by the content receiving apparatus in response to the selection of the content to be downloaded by the user via the user interface, the download control information indicating whether the selected content is broadcast based or communication based;

the content providing apparatus delivering the selected content using an RF broadcasting signal in accordance with broadcast schedule information and broadcast stream information included in the download control information when the selected content is broadcast based content; and the content providing apparatus starting providing of the selected content through the Internet in response to a second request from the content receiving apparatus based on second URL information included in the download control information when the selected content is communication based content, wherein when the download control information indicates the selected content is broadcast based and the content receiving apparatus fails to download the selected content delivered using the RF broadcasting signal, the content receiving apparatus downloads the selected content provided through the Internet to compensate for the failed download of the selected content delivered using the RF broadcasting signal.

11. A non-transitory computer readable medium having instructions stored therein that when executed by a computer cause the computer to provide a content to a content receiving apparatus to perform a method comprising:

providing downloadable content information to the content receiving apparatus, the content receiving apparatus outputting a user interface for selection of the content from at least one content that is identified in the downloadable content information as available for download by the content receiving apparatus;

providing, by a server associated with first URL information included in the downloadable content information, download control information to the content receiving apparatus in response to a first request from the content receiving apparatus, the download control information being associated with the content of the at least one content selected by the user via the user interface, the first request being generated by the content receiving apparatus in response to the selection of the content to be downloaded by the user via the user interface, the download control information indicating whether the selected content is broadcast based or communication based;

delivering the selected content using an RF broadcasting signal in accordance with broadcast schedule information and broadcast stream information included in the download control information when the selected content is broadcast based content; and starting providing of the selected content through the Internet in response to a second request from the content receiving apparatus based on second URL information included in the download control information when the selected content is communication based content, wherein when the download control information indicates the selected content is broadcast based and the content receiving apparatus fails to download the selected content delivered using the RF broadcasting signal, the content receiving apparatus downloads the selected content provided through the Internet to compensate for the failed download of the selected content delivered using the RF broadcasting signal.

12. A content receiving apparatus comprising:

circuitry configured to receive downloadable content information that identifies at least one content that is available for download, output, for display to a user, a user interface for selection of a content from the at least one content identified in the downloadable content information, receive a user's selection of the content from the at least one content identified in the received downloadable content information via the user interface, download, from the Internet based on first URL information included in the downloadable content information, download control information in response to the user's selection of the content via the user interface, the download control information being associated with the selected content and indicating whether the selected content is broadcast based or communication based, determine whether the download control information indicates the selected content is broadcast based or communication based, schedule download of the selected content from an RF broadcasting signal, based on broadcast schedule information and broadcast stream information that are both included in the download control information, when the download control information indicates the selected content is broadcast-based content, start download of the selected content from the Internet, based on second URL information included in the download control information, when the download control information indicates the selected content is communication-based content, and when the download control information indicates the selected content is broadcast based and the download of the selected content from the RF broadcasting signal fails, download the selected content from the Internet to compensate for the failed download of the selected content from the RF broadcasting signal.

13. The content receiving apparatus according to claim 12,
wherein the download control information associated with the broadcast-based content further includes alternative communication information for downloading the same communication-based content as the broadcast-based content, and
the circuitry
determines that the download of the selected content from the RF broadcasting signal fails when broadcasting of the broadcast-based content has been already completed, and
downloads the same communication-based content as the broadcast-based content in accordance with the alternative communication information to compensate for the failed download of the selected content from the RF broadcasting signal.

14. The content receiving apparatus according to claim 12,
wherein the circuitry also downloads playback control information necessary for playing back the downloaded content based on the download control information.

15. The content receiving apparatus according to claim 14,
wherein the circuitry acquires a license including a key for decrypting the downloaded content based on either the download control information or the playback control information; and
the circuitry plays back the downloaded content using the obtained license.

16. A method of receiving a content in a content receiving apparatus, the method comprising:
receiving downloadable content information that identifies at least one content that is available for download;
outputting, for display to a user, a user interface for selection of a content from the at least one content identified in the downloadable content information;
receiving a user's selection of the content from at least one content identified in the received downloadable content information via the user interface;
downloading, from the Internet based on first URL, information included in the downloadable content information and by circuitry of the content receiving apparatus, download control information in response to the user's selection of the content via the user interface, the download control information being associated with the selected content and indicating whether the selected content is broadcast based or communication based;
determining whether the download control information indicates the selected content is broadcast based or communication based;
scheduling downloading of the selected content from an RF broadcasting signal, based on broadcast schedule information and broadcast stream information that are both included in the download control information, when the download control information indicates the selected content is broadcast-based content;
starting downloading of the selected content from the Internet, based on second URL information included in the download control information, when the download control information indicates the selected content is communication-based content, and
when the download control information indicates the selected content is broadcast based and the downloading of the selected content from the RF broadcasting signal fails, downloading the selected content from the Internet to compensate for the failed download of the selected content from the RF broadcasting signal.

17. A non-transitory computer readable medium having instructions stored therein that when executed by a computer cause the computer to:
receive downloadable content information that identifies at least one content that is available for download;
output, for display to a user, a user interface for selection of a content from the at least one content identified in the downloadable content information;
receive a user's selection of the content from at least one content identified in received downloadable content information via the user interface;
download, from the Internet based on first URL information included in the downloadable content information, download control information in response to the user's selection of the content via the user interface, the download control information being associated with the selected content and indicating whether the selected content is broadcast based or communication based;
determine whether the download control information indicates the selected content is broadcast based or communication based;
schedule download of the selected content from an RF broadcasting signal, based on broadcast schedule information and broadcast stream information that are both included in the download control information, when the download control information indicates the selected content is broadcast-based content,
start download of the selected content from the Internet, based on second URL information included in the download control information, when the download control information indicates the selected content is communication-based content, and
when the download control information indicates the selected content is broadcast based and the download of the selected content from the RF broadcasting signal fails, download the selected content from the Internet to compensate for the failed download of the selected content from the RF broadcasting signal.

18. A content downloading system including a content providing subsystem and a content receiving apparatus connected to each other through the Internet, the system comprising:
the content providing subsystem including
content-information providing circuitry that provides downloadable content information to the content receiving apparatus, the downloadable content information identifying at least one content that is available for download by the content receiving apparatus,
control-information providing circuitry that provides download control information to the content receiving apparatus in response to a first request from the content receiving apparatus, the download control information being associated with content of the at least one content selected by a user based on the content information, the first request being generated by the content receiving apparatus in response to the selection of the content to be downloaded by the user, the download control information indicating whether the selected content is broadcast based or communication based, a transmitter that delivers the broadcast-based content using an RF broadcasting signal in accordance with a broadcasting schedule, and a content server that starts providing the communication-based content through the Internet in response to a second request from the content receiving apparatus based on the download control information; and the content receiving apparatus including circuitry configured to receive the downloadable content information that identifies the at least one content that is available for download;

output for display to the user, a user interface for selection of the content from the at least one content identified in the downloadable content information;

receive the user's selection of the content identified in the downloadable content information via the user interface, download, from the content-information providing circuitry through the Internet based on first URL information included in the downloadable content information, the download control information in response to the user's selection of the content via the user interface, determine whether the download control information indicates the selected content is broadcast based or communication based, schedule download of the selected content from the RF broadcasting signal, based on broadcast schedule information and broadcast stream information that are both included in the download control information, when the download control information indicates the selected content is broadcast-based content, start download of the selected content from the content server through the Internet, based on second URL information included in the download control information, when the download control information indicates the selected content is communication-based content, and when the download control information indicates the selected content is broadcast based and the download of the selected content from the RF broadcasting signal fails, download the selected content from the Internet to compensate for the failed download of the selected content from the RF broadcasting signal.

19. The content providing apparatus according to claim 1, wherein the format of the download control information corresponding to broadcast-based content and the format of the download control information corresponding to communication-based content include a plurality of the same data fields.

20. The content receiving apparatus according to claim 12, wherein the circuitry is configured to obtain, via a network, content information necessary for the user to select the content to be downloaded to the content receiving apparatus; and obtain, via the network, the download control information based on the destination included in the obtained content information.

21. The content receiving apparatus according to claim 12, wherein the circuitry is configured to display the user interface for the selection of the content according to the at least one content identified in the downloadable content information.

22. A television receiver comprising the content receiving apparatus of claim 12.

* * * * *